United States Patent
Yazaki et al.

(10) Patent No.: US 7,331,718 B2
(45) Date of Patent: Feb. 19, 2008

(54) OPTICAL CONNECTOR, OPTICAL FIBER WITH CONNECTOR, OPTICAL FIBER CONNECTING DEVICE, AND OPTICAL FIBER CONNECTION METHOD

(75) Inventors: Akihiko Yazaki, Tokyo (JP); Takaya Yamauchi, Kanagawa (JP); James R. Bylander, Austin, TX (US); Eric M. Morgan, Apex, NC (US); Wesley A. Raider, Baldwin, WI (US); Kirk L. Taylor, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 71 days.

(21) Appl. No.: 10/897,741

(22) Filed: Jul. 23, 2004

(65) Prior Publication Data

US 2005/0141817 A1 Jun. 30, 2005

(30) Foreign Application Priority Data

Dec. 24, 2003 (JP) ............................. 2003-428071

(51) Int. Cl.
G02B 6/36 (2006.01)
(52) U.S. Cl. ...................................... 385/78
(58) Field of Classification Search .................. 385/60, 385/65, 72
See application file for complete search history.

(56) References Cited

U.S. PATENT DOCUMENTS 4,611,887 A 9/1986 Glover et al.

5,042,902 A 8/1991 Huebscher et al.

(Continued)

FOREIGN PATENT DOCUMENTS

EP 0 486 064 A2 11/1990

(Continued)

OTHER PUBLICATIONS

Reith, L.A.; "Issues Relating to the Performance of Optical Connectors and Splices", *Passive Fiber Optic Components and Their Reliability* (Apr. 6-8, 1993); SPIE vol. 1973; Berlin, DE; Bellingham, WA, US; pp. 294-305.

*Primary Examiner*—Michelle Connelly-Cushwa
*Assistant Examiner*—Chris H. Chu
(74) *Attorney, Agent, or Firm*—Gregg H. Rosenblatt

(57) ABSTRACT

A plug-type optical connector 10 is provided with a ferrule 22 and an aligning sleeve member 24. The aligning sleeve member 24 receives a portion of the ferrule 22 including an abutting end face 48 inside a bore 58 to prevent staining and damage and uses a movable shutter 54 to prevent light emitted through the ferrule 22 from leaking to the outside. The socket type optical connector 14 is provided with a ferrule 92 and a holding section 94. The optical connector 14 is not provided with an aligning sleeve member and further can hold a coated optical fiber by a holding section 94 behind the ferrule 92 by a radius of curvature of at least a prescribed minimum radius of curvature. Optical loss in the coated optical fiber can be reduced while effectively reducing the external dimensions in the direction of extension of the ferrule 92 at the time of use. An optical fiber connecting device that includes a combination of a pair of optical connectors is also provided to be suitably applied to an optical transmission line laid indoors.

5 Claims, 21 Drawing Sheets

U.S. PATENT DOCUMENTS

| | | | |
|---|---|---|---|
| 5,082,344 A * | 1/1992 | Mulholland et al. | 385/60 |
| 5,094,552 A * | 3/1992 | Monroe et al. | 385/76 |
| 5,129,023 A * | 7/1992 | Anderson et al. | 385/70 |
| 5,159,653 A | 10/1992 | Carpenter et al. | |
| 5,347,603 A * | 9/1994 | Belenkiy et al. | 385/86 |
| 5,363,460 A * | 11/1994 | Marazzi et al. | 385/70 |
| 5,390,272 A * | 2/1995 | Repta et al. | 385/100 |
| 5,461,690 A * | 10/1995 | Lampert | 385/100 |
| 5,542,015 A * | 7/1996 | Hultermans | 385/60 |
| 5,619,610 A * | 4/1997 | King et al. | 385/139 |
| 5,710,851 A * | 1/1998 | Walter et al. | 385/86 |
| 5,734,770 A | 3/1998 | Carpenter et al. | |
| 5,812,718 A | 9/1998 | Carpenter et al. | |
| 5,940,561 A * | 8/1999 | Dean et al. | 385/60 |
| 5,963,699 A | 10/1999 | Tanaka et al. | |
| 6,193,421 B1 | 2/2001 | Tamekuni et al. | |
| 6,302,592 B1 * | 10/2001 | Zullig | 385/60 |
| 6,457,878 B2 | 10/2002 | Edwards et al. | |
| 6,595,696 B1 * | 7/2003 | Zellak | 385/72 |
| 2001/0043777 A1 * | 11/2001 | Lu | 385/60 |
| 2001/0048790 A1 * | 12/2001 | Burkholder et al. | 385/78 |
| 2003/0108303 A1 | 6/2003 | Asada | |
| 2003/0147597 A1 * | 8/2003 | Duran | 385/76 |
| 2004/0252949 A1 * | 12/2004 | Verhagen | 385/86 |
| 2004/0258370 A1 | 12/2004 | Bush et al. | |
| 2006/0072884 A1 | 4/2006 | Yamauchi et al. | |
| 2006/0153515 A1 | 7/2006 | Honma et al. | |
| 2006/0280417 A1 | 12/2006 | Sato et al. | |

FOREIGN PATENT DOCUMENTS

| | | |
|---|---|---|
| EP | 0 742 456 A1 | 11/1996 |
| EP | 1 072 914 A | 1/2001 |
| FR | 2 464 490 | 3/1981 |
| JP | 10-111434 | 4/1998 |
| JP | 2000-235132 | 8/2000 |
| JP | 2003-161863 | 6/2003 |
| WO | WO 93/21547 | 10/1993 |
| WO | WO 95/07794 | 3/1995 |

* cited by examiner

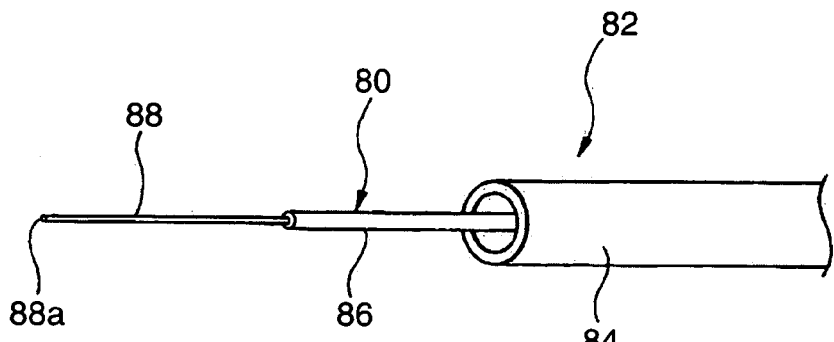
Fig. 14a
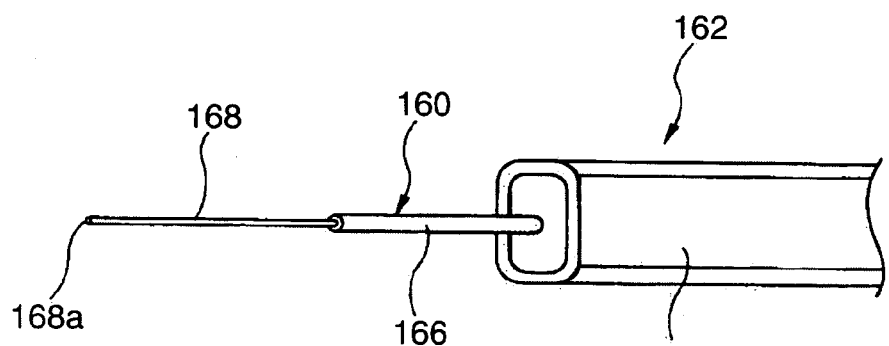
Fig. 14b
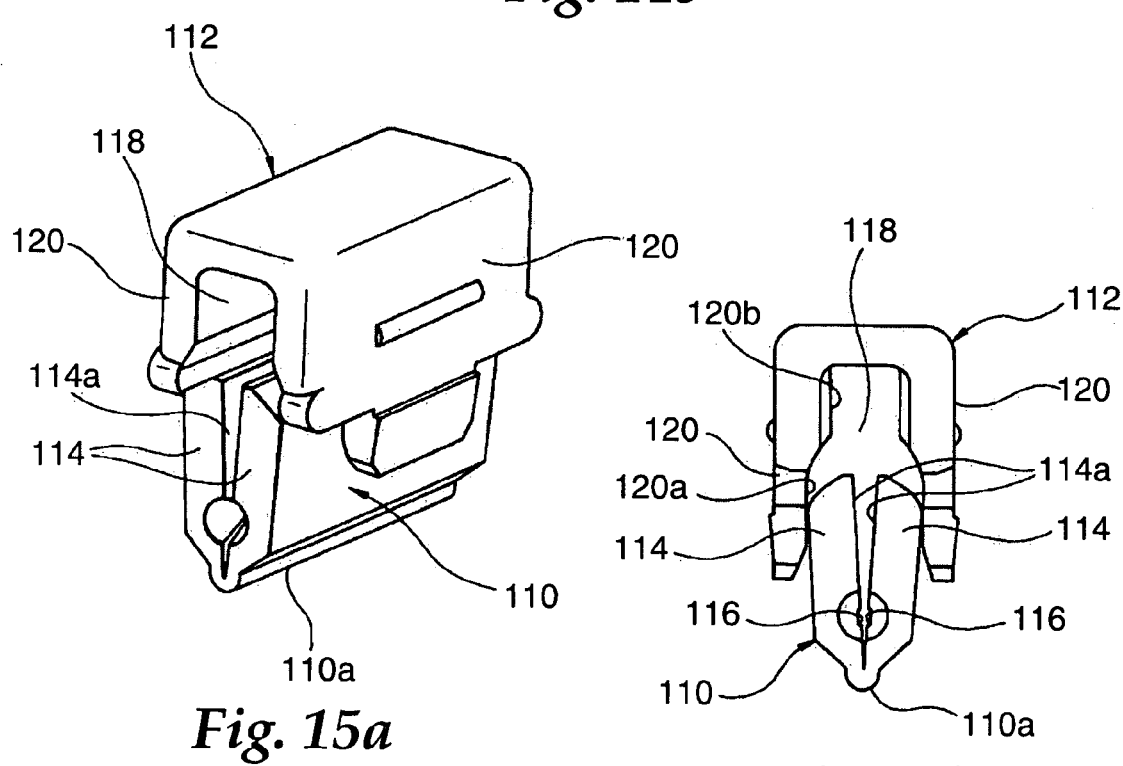
Fig. 15a
Fig. 15b

OPTICAL CONNECTOR, OPTICAL FIBER WITH CONNECTOR, OPTICAL FIBER CONNECTING DEVICE, AND OPTICAL FIBER CONNECTION METHOD

RELATED APPLICATION

This application claims priority from Japanese Application No. 2003-428071, filed Dec. 24, 2003.

TECHNICAL FIELD

The present invention relates to technology for connection of optical fibers. More particularly, the present invention relates to an optical connector having a ferrule, an optical fiber having an optical connector attached to an end, an optical fiber connecting device comprising a combination of a pair of optical connectors, and an optical fiber connection method for interconnecting a pair of optical fibers in a state with end faces abutting against each other.

BACKGROUND OF THE INVENTION

In technology for connection of optical fibers, there is known an optical connector equipped with a ferrule securing supporting an optical fiber from which the coating has been removed at a predetermined position of the connector body. A single-fiber ferrule generally is a cylindrical member formed with a through hole for holding the fiber along its center axis and provided with an abutting end face at one end in the axial direction of a centering part having a cylindrical outer circumference and a fiber holding channel opening at the abutting end face and securely holding the optical fiber in the centering part (for example, see Japanese Unexamined Patent Publication (Kokai) No. 2000-235132). This type of optical connector forms a connector able to be connected to and disconnected from an optical transmission line and can be used attached to an end of an optical transmission-line member, such as an optical fiber cord or optical fiber cable, including a coated optical fiber. Note that in this specification, an "optical fiber cord" means a coated optical fiber wound around with a tension-bearing plastic fiber and formed over that with a plastic sheath which can be simply used for connection between parts in an optical device or between optical devices. Further, an "optical fiber cable" means a plurality of coated optical fibers bundled together and housed in a plastic sheath together with a wire-shaped tension-bearing member which is used for connection between telephone exchange offices or between a terminal office and subscribers.

When using an optical connector with a ferrule to interconnect a pair of coated optical fibers, an aligning sleeve member is used for coaxially positioning and holding in alignment the ferrules of the optical connectors attached to the front ends of the two coated optical fibers in a state with the abutting end faces abutting against each other. The aligning sleeve member is provided with a tubular elastic positioning element called a "slotted sleeve". This slotted sleeve contacts the cylindrical outer circumference of the centering part of the ferrule to be connected and is elastically pushed wider so as to center and support the ferrule at a predetermined position under this elastic recovery force. Therefore, by inserting into one slotted sleeve of the aligning sleeve member the centering parts of a pair of ferrules holding optical fibers in their fiber holding channels, these centering parts are aligned coaxially in the axial direction. Further, by making the abutting end faces of the two ferrules abut by for example a spring bias force, the pair of coated optical fibers is connected in a state with the end faces abutting against each other centered to a high accuracy.

As an optical fiber connecting device using optical connectors with ferrules and an aligning sleeve member to connect coated optical fibers, there is known a configuration using a pair of optical connectors differing in shapes of connector bodies, i.e., of the so-called plug (male) type and socket (female) type. In this configuration, the body of the socket type connector is usually provided with an engagement recess for receiving the part around the ferrule of the body of the plug-type connector. Further, the aligning sleeve member is set secured or detachably in the engagement recess of the socket-type connector body in a state receiving the ferrule of the socket-type connector in advance (for example, see Japanese Unexamined Patent Publication (Kokai) No. 10-111434).

In this way, optical fiber connecting devices employing optical connectors with ferrules are configured with the pair of ferrules aligned in the axial direction inside the slotted sleeve of the aligning sleeve member, so the external dimensions of the devices in the direction of extension of the ferrule tend to become relatively large. As a result, depending on the set locations of the optical fiber connecting devices, sometimes it is necessary to lay the optical fiber cords (or optical fiber cables) extending from the individual optical connectors bent large near the optical connectors. At that time, from the viewpoint of suppressing optical loss, an optical connector provided with a guide for restricting the radius of curvature of the optical fiber cord so that the coated optical fiber is not bent by a radius smaller than the prescribed value of the minimum radius of curvature has been proposed (for example, see Japanese Unexamined Patent Publication (Kokai) No. 2003-161863).

SUMMARY

According to an aspect of the present invention, a plug-type optical connector comprises a body and a ferrule provided in the body and having an abutting end face. The optical connector comprises an aligning sleeve member provided with a cylindrical bore having openings at opposite axial ends, the aligning sleeve member receiving in a part of the bore a certain length of the ferrule adjoining the abutting end face and being supported at a predetermined position with respect to the ferrule. The aligning sleeve member includes a counterpart connector engagement section projecting in a plug shape outside the body.

According to another aspect, the aligning sleeve member includes a movable shutter provided to be passively displaceable in the bore. The movable shutter is arranged at such a position that the shutter projects into the bore between the ferrule received from one of the openings of the bore and another opening, to block light emitted through the ferrule.

According to another aspect, the aligning sleeve member is detachably attached to the body.

According to another aspect, an optical fiber includes a connector and comprises a plug-type optical connector as described above and an optical fiber cable containing a coated optical fiber, the ferrule being attached to a distal end of the coated optical fiber.

According to another aspect, an optical connector comprises a body and a ferrule provided in the body and having an abutting end face. The optical connector comprises an aligning sleeve member provided with a cylindrical bore having openings at opposite axial ends, the aligning sleeve member receiving in a part of the bore a certain length of the ferrule adjoining the abutting end face and being supported at a predetermined position with respect to the ferrule. The aligning sleeve member includes a movable shutter provided to be passively displaceable in the bore. The movable shutter is arranged at such a position that the shutter projects into the bore between the ferrule received from one of the openings of the bore and another opening, to block light emitted through the ferrule.

According to another aspect, an optical connector comprises a body and a ferrule provided in the body, the ferrule having an abutting end face and a fiber holding channel opening in the abutting end face. The optical connector further comprises a holding section provided in the body to be spaced from an end face of the ferrule, opposite to the abutting end face, by a predetermined distance. The ferrule is displaceable in a direction substantially parallel to the fiber holding channel on the body in such a state as to be attached to a distal end of a coated optical fiber. The holding section is provided with a holding groove extending in a direction inclined with respect to a direction of extension of the fiber holding channel of the ferrule and makes the coated optical fiber bend between the ferrule and the holding groove by a radius of curvature of at least a predetermined minimum radius of curvature, regardless of a position of the ferrule on the body.

According to another aspect, the holding section includes a holding member provided in the body to be movable between a functional position, where the holding groove extends in the direction inclined with respect to the direction of extension of the fiber holding channel of the ferrule, and a nonfunctional position, where the holding groove extends in a direction substantially parallel to the direction of extension of the fiber holding channel.

According to another aspect, the holding section further includes an engaging member provided in the body separately from the holding member, the engaging member being engaged with an optical transmission line member received in the holding groove to statically hold the optical transmission line member in the holding groove when the holding member is placed at the functional position.

According to another aspect, an optical fiber with a connector comprises the optical connector as described above and an optical fiber cable containing a coated optical fiber, the ferrule being attached to a distal end of the coated optical fiber.

According to another aspect, an optical fiber connecting device comprises the plug-type optical connector described above and the optical connector described above, being detachably combined with each other.

According to another aspect, an optical connector comprises a body and a ferrule provided in the body and having a center axis. The optical connector further comprises a holding member provided in the body to be spaced from the ferrule and including a holding groove for receiving an optical transmission-line member. The holding member is movable between a first position where the holding groove extends in a direction inclined with respect to the center axis of the ferrule and a second position where the holding groove extends in a direction substantially parallel to the center axis of the ferrule. The holding member makes a coated optical fiber of the optical transmission-line member bend between the ferrule and the holding groove by a radius of curvature of at least a predetermined minimum radius of curvature. An engaging member is provided in the body separately from the holding member. The engaging member is engaged with the optical transmission-line member received in the holding groove to statically hold the optical transmission-line member in the holding groove when the holding member is placed at the first position.

According to another aspect, an optical fiber with a connector comprises an optical connector with a ferrule and a coated optical fiber, the ferrule being attached to a distal end of the coated optical fiber. The ferrule is provided with an abutting end face and a fiber holding channel opening in the abutting end face and accommodating an optical fiber of the coated optical fiber. The coated optical fiber includes a beveled area formed adjoining an axial end face of the optical fiber and extending to be tapered toward the axial end face, and a free area formed adjoining the beveled area and being not secured to the fiber holding channel over a range of a predetermined length from the abutting end face in the fiber holding channel of the ferrule.

According to another aspect, an optical fiber with a connector comprises an optical connector with a ferrule and a coated optical fiber, the ferrule being attached to a distal end of the coated optical fiber. The ferrule is provided with an abutting end face and a fiber holding channel opening in the abutting end face and accommodating an optical fiber of the coated optical fiber. The coated optical fiber is attached to the ferrule in such a manner that an axial end face of the optical fiber projects outward from the abutting end face of the ferrule. A free area is provided that is not secured to the fiber holding channel over a range of a predetermined length from the abutting end face in the fiber holding channel of the ferrule.

According to another aspect, an optical fiber connection method for interconnecting a pair of optical fibers in an end abutting state comprises providing a pair of ferrules respectively including abutting end faces and fiber holding channels opening at the abutting end faces for accommodating optical fibers. The method further comprises forming a beveled area extending tapered toward an axial end face adjoining the axial end face on at least one of the pair of optical fibers. The method further includes respectively inserting the pair of optical fibers through the fiber holding channels of the pair of ferrules to making the axial end face of at least one of the optical fibers project outward from an abutting end face of a corresponding ferrule, and providing at least one of the optical fibers with a free area not secured to the fiber holding channel over a range of a predetermined length from the abutting end face in the fiber holding channel of the corresponding ferrule. The method further includes arranging the pair of ferrules at aligning positions where the fiber holding channels are straightly aligned with each other, and making the axial end faces of the pair of optical fibers abut against each other under pressure.

In recent years, to meet with the demands for higher speed data communications utilizing the Internet, lead-in work has been performed to extend and lay optical fiber cables from public optical fiber networks to individual homes. In such lead-in work, generally an optical fiber cable is laid inside walls of a home using metal pipe and a socket-type optical connector attached to the end of the optical fiber cable is arranged in a switchbox provided at a predetermined location in the home. Further, the optical terminal used indoors and the optical connector in the switchbox are detachably connected using an optical fiber cord equipped with a plug-type optical connector at its front end. Note that when the optical terminal is equipped with a socket-type optical connector, an optical fiber cord equipped with plug-type optical connectors at its two ends is used.

This connection technology in optical transmission lines laid indoors desirably satisfies various requirements from the perspectives of on-site installation efficiency and safety.

For example, the switchbox and other wiring devices are generally standardized in dimensions (JIS). With a conventional socket-type optical connector with a built-in aligning sleeve member, in particular due to the external dimensions in the ferrule extension direction, sometimes it is difficult to hold the connector with a margin of space in the switchbox to an extent able to avoid undesirable bending of the optical fiber cable. Therefore, it has been demanded to reduce the external dimensions of a socket-type optical connector with a ferrule to an extent enabling the connector to be held in a switchbox with a margin of space while suppressing optical loss in the optical fiber cable.

Further, work for laying the cable to the inside of a wall is generally performed while selecting the optimum laying route on-site, so normally the socket-type connector is attached to the end of the optical fiber cable in the switchbox after finishing laying the optical fiber cable in the wall. Therefore, a socket-type optical connector is required to have a superior installation efficiency enabling such on-site cable attachment work to be performed quickly and accurately. Further, a socket-type optical connector set in a switchbox desirably can prevent in advance contact of the hand or deposition of dirt on the abutting end face of the ferrule and enable easy cleaning of the part around the ferrule and simultaneously is required for safety reasons to prevent light emitted from the optical fiber through the ferrule from leaking out from the switchbox. On the other hand, a plug-type optical connector can be attached to an optical fiber cord in advance at the factory before shipment, but is more susceptible to contact by the hand or deposition of dirt than a socket-type optical connector. Further, there is a danger of light emitted from the ferrule unintentionally hitting the eye, so there is a strong demand for the ferrule to have a dirt-proofing function and light-blocking function.

Also, in an optical fiber connecting system using an optical connector, it is desirable that, when an external force, such as a tensile force, is applied to an optical fiber cable, a proper optical connection is able to be maintained against such external force. Particularly, in the socket-type optical connector often securely arranged in a receptive member such as a switch box, it has been required to surely prevent a joint portion of the optical fiber cable and the optical connector from being damaged due to the external force such as a tensile force.

Further, to suppress connection loss in optical transmission lines, it is required to form the end faces of the optical fibers to be brought into abutment with each other as mirror surfaces extending accurately in a perpendicular direction with respect to the axis and to position the end faces of the optical fibers accurately at an order of 0.1 mm with respect to the abutting end faces of the ferrules. However, in such on-site optical connector attachment work, forming the end faces of the optical fibers as such high accuracy perpendicular mirror surfaces or such high accuracy positioning is normally difficult. Therefore, the technology for connection of optical fibers suitably applied to optical transmission lines laid indoors desirably can suppress as much as possible the connection loss without requiring the formation of perpendicular mirror surface-like end faces at the optical fibers or high accuracy positioning of the end faces. Further, no technology for connection of optical fibers satisfying all of the various requirements as listed above has been realized in the past.

It is an object of the present invention to provide an optical connector having a ferrule, in which it is possible to effectively reduce the outside dimensions in the direction of extension of the ferrule and which has superior on-site installation efficiency and safety.

It is another object of the present invention to provide an optical connector having a ferrule, which has a superior dirt-proofing function and light-blocking function.

It is a further object of the present invention to provide an optical connector having a ferrule, which is able to maintain a proper optical connection against an external force, such as a tensile force, applied to an optical transmission-line member.

It is a further object of the present invention to provide an optical fiber with a connector, including an optical connector attached at a distal end, which is able to effectively reduce the outside dimension in the direction of extension of the ferrule of the optical connector, and which has superior on-site installation efficiency and safety in association with the optical connector.

It is a further object of the present invention to provide an optical fiber with a connector, including an optical connector attached at a distal end, which has a superior dirt-proofing function and light-blocking function in association with the optical connector.

It is a further object of the present invention to provide an optical fiber connecting device comprised of a combination of a pair of optical connectors, which can be suitably used for an optical transmission line laid indoors.

It is a further object of the present invention to provide an optical fiber connection method for interconnecting a pair of optical fibers in an end abutting state, which enables maximum suppression of connection loss while connecting optical fibers with each other, even in the case of connector attachment work at construction sites, without requiring the formation of perpendicular mirror surface-like end faces at the optical fibers or high accuracy positioning of the end faces.

According to the invention aspects set forth above, the plug-type optical connector is equipped with an aligning sleeve member receiving in its bore the part of the ferrule set in the body including the abutting end face, so it is possible to prevent in advance contact by the hand or deposition of dirt on particularly the abutting end face of the ferrule. Further, by engaging the other connector engagement section of the aligning sleeve member with the connector to be connected with, it is possible to eliminate the aligning sleeve member from the other connector. This contributes to a reduction in the external dimensions of the other connector.

According to further invention aspects set forth above, while the optical connector is not connected with the other optical connector in the state attached to the coated optical fiber, light emitted through the ferrule leaking outward from the aligning sleeve member is reliably prevented by the movable shutter. The movable shutter is set in the bore of the aligning sleeve member, so there is no danger of the movable shutter being unintentionally operated. Further, since the aligning sleeve member supported by the ferrule is provided with a movable shutter, regardless of the external shape of the optical connector, a light-blocking function can be easily imparted.

According to further invention aspects set forth above, by detaching the aligning sleeve member from the body, the area around the ferrule can be easily cleaned.

According to further invention aspects set forth above, an optical fiber with a connector having a superior dirt-proofing function and light-blocking function at the optical connector is obtained. This optical fiber with a connector can exhibit a high degree of safety and contribute to the construction of an optical transmission line with a high stability and reliability.

According to further invention aspects set forth above, the aligning sleeve member prevents in advance contact by the hand or deposition of dirt in particular at the abutting end face of the ferrule and the movable shutter reliably prevents light emitted through the ferrule leaking to the outside from the aligning sleeve member.

According to further invention aspects set forth above, no aligning sleeve member holding the ferrule is provided and further the coated optical fiber to be attached to can be held behind the ferrule by bending it by a radius of curvature of at least the predetermined minimum radius of curvature, so it is possible to effectively reduce the external dimensions in the direction of extension of the ferrule at the time of use while suppressing optical loss in the coated optical fiber. This bending of the coated optical fiber is based on the inclination angle of the holding groove and the distance between the holding groove and ferrule, so even when performing work for attaching the connector to an optical fiber cable at the work site for example, the optical connector can be attached to the coated optical fiber quickly and accurately. Further, the coated optical fiber extending bent between the ferrule and holding groove at the time of use can be bent slightly in a range not reaching a radius smaller than the prescribed minimum radius of curvature when the ferrule is displaced to the axial direction when connecting the optical connector with the opposing optical connector, so a connection with little optical loss can be stably formed. Further, a configuration of the optical connector not provided with an aligning sleeve member is also effective in facilitating cleaning of the area around the ferrule.

According to further invention aspects set forth above, there is no unintentional concentration of twisting or tension or other stress at the coated optical fiber along with movement of the holding member from the nonfunctional position to the functional position and the coated optical fiber can be bent to a predetermined radius of curvature, so the on-site connector attachment work becomes remarkably easier.

According to further invention aspects set forth above, the engaging member provided in the body statically holds the optical cable including the coated optical fiber bent to a predetermined radius of curvature by the holding member located at the functional position against an external force such as a tensile force, so as to maintain a proper optical connection.

According to further invention aspects set forth above, an optical fiber with a connector having an effect of reduction of the external dimensions of the optical connector and a superior on-site installation efficiency and safety is obtained. This optical fiber with a connector can be particularly suitably used as an optical fiber cable laid using metal pipe inside the wall of a home in lead-in work for extending and laying an optical fiber cable from for example a public optical fiber network to individual homes. In this application, the optical connector can be held with a sufficient margin of space in a switchbox provided at a desired position indoors while suppressing the optical loss in the optical fiber cable.

According to further invention aspects set forth above, an optical fiber connecting device able to be particularly suitably applied to an optical transmission line laid indoors is obtained.

According to further invention aspects set forth above, in the optical cable with the ferrule, the engaging member provided in the body statically holds the optical transmission-line member including the coated optical fiber bent to a predetermined radius of curvature by the holding member located at the first position against an external force such as a tensile force, so as to maintain a proper optical connection.

According to further invention aspects set forth above, even without forming the axial end face of the optical fiber as a perpendicular mirror surface, it is possible to reduce as much as possible the gap from the axial end face of the optical fiber to be connected to by the relief action of the beveled area to form an optical fiber connection suppressed in connection loss.

According to further invention aspects set forth above, even without positioning the axial end face of the coated optical fiber with a high accuracy with respect to the abutting end face of the ferrule, it is possible to make the axial end face projecting out from the abutting end face into reliable abutment with the axial direction end face of the coated optical fiber to be connected to so as to form an optical fiber connection suppressed in connection loss.

According to further invention aspects set forth above, even when performing connector attachment work on a construction site, it is possible to suppress as much as possible the connection loss while connecting the coated optical fibers without forming perpendicular mirror surface-like end faces at the coated optical fibers or requiring high accuracy position of the end faces.

BRIEF DESCRIPTION OF THE DRAWINGS

FIG. 14 shows (a) a view of an optical fiber cord of an optical fiber with a connector of FIG. 3 and (b) a view of an optical fiber cable of an optical fiber with a connector of FIG. 7.

FIG. 15 shows views of a fiber securing member and actuating member attached to the optical connector of FIG. 5, wherein (a) is a perspective view and (b) is a front view.

DETAILED DESCRIPTION

Figure 1:
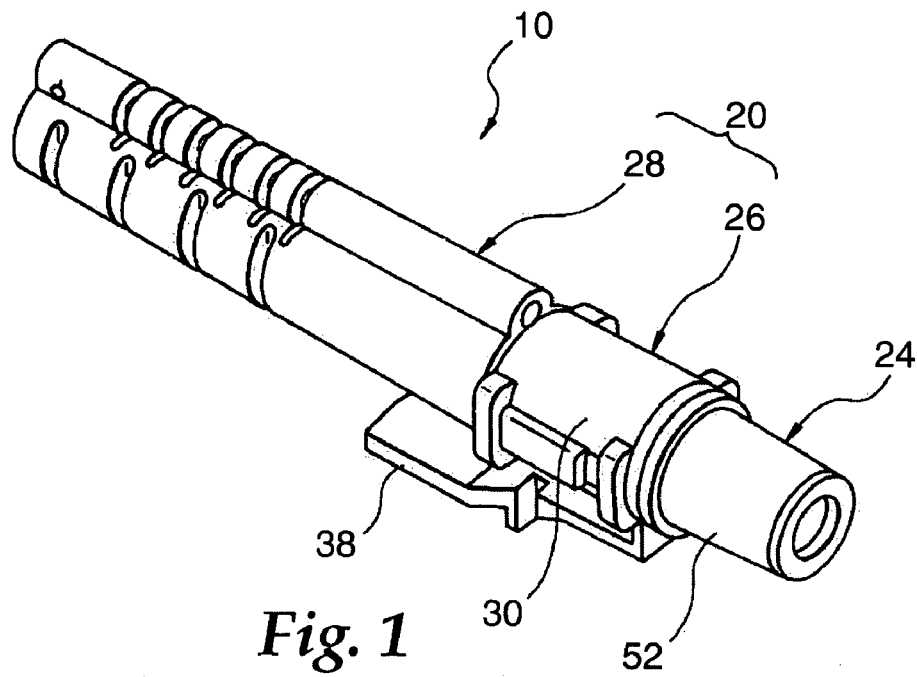
FIG. 1 is a perspective view of an optical connector according to an embodiment of the present invention.

Below, embodiments of the present invention will be explained in detail with reference to the attached drawings. Throughout the drawings, corresponding components are assigned common reference numerals.

Figure 2:
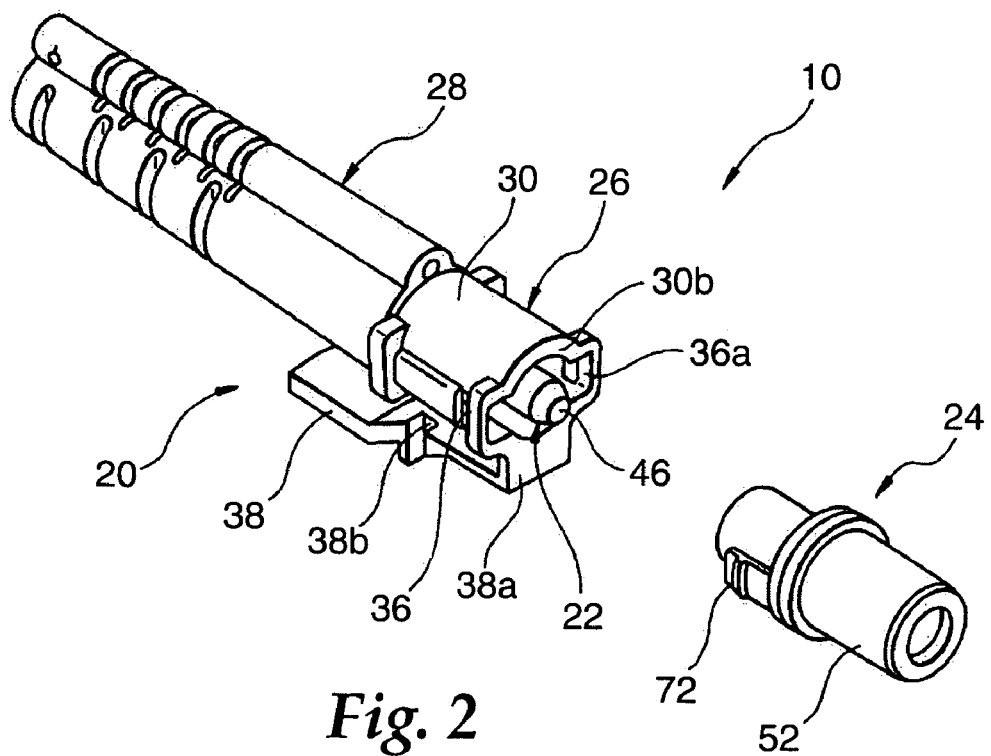
FIG. 2 is a disassembled perspective view of an optical connector of FIG. 1.
Figure 3:
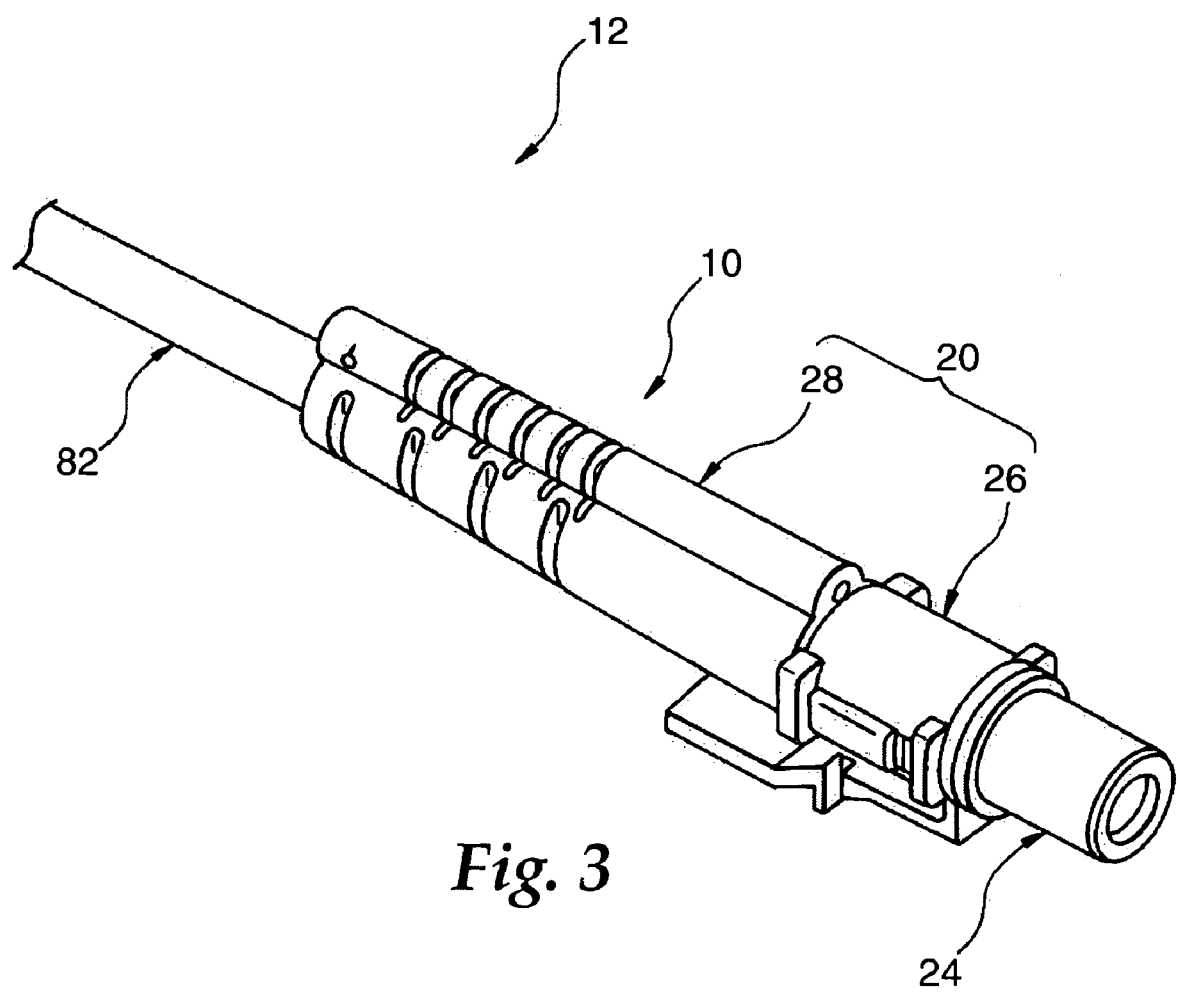
FIG. 3 is a perspective view of an optical fiber with a connector according to an embodiment of the present invention having the optical connector of FIG. 1.
Figure 4A:
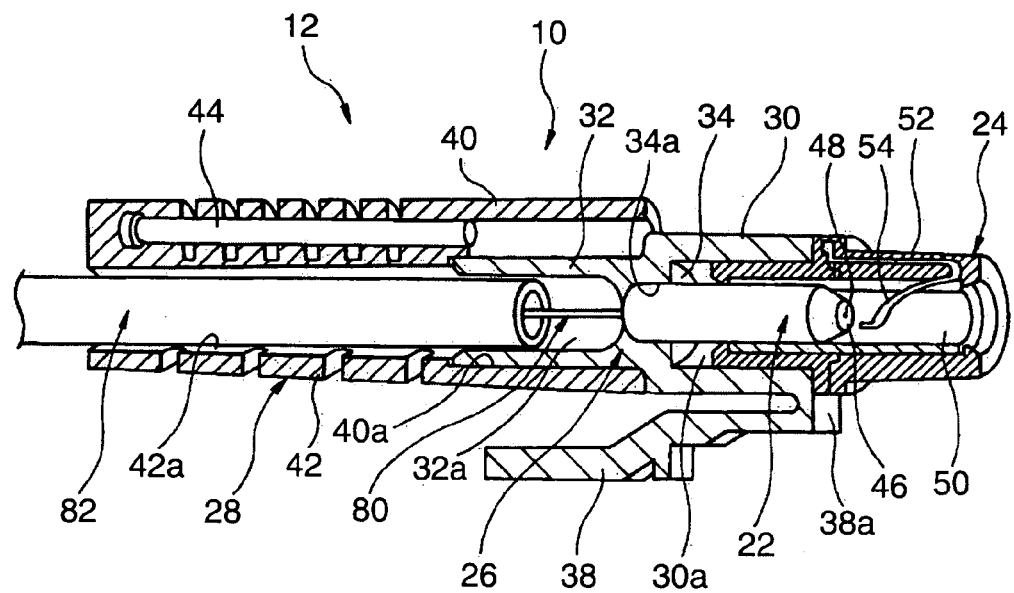
FIG. 4 shows vertical sectional views of an optical fiber with a connector of FIG. 3, wherein (a) shows the state with an aligning sleeve member attached and (b) shows the state with the aligning sleeve member detached.
Figure 4B:
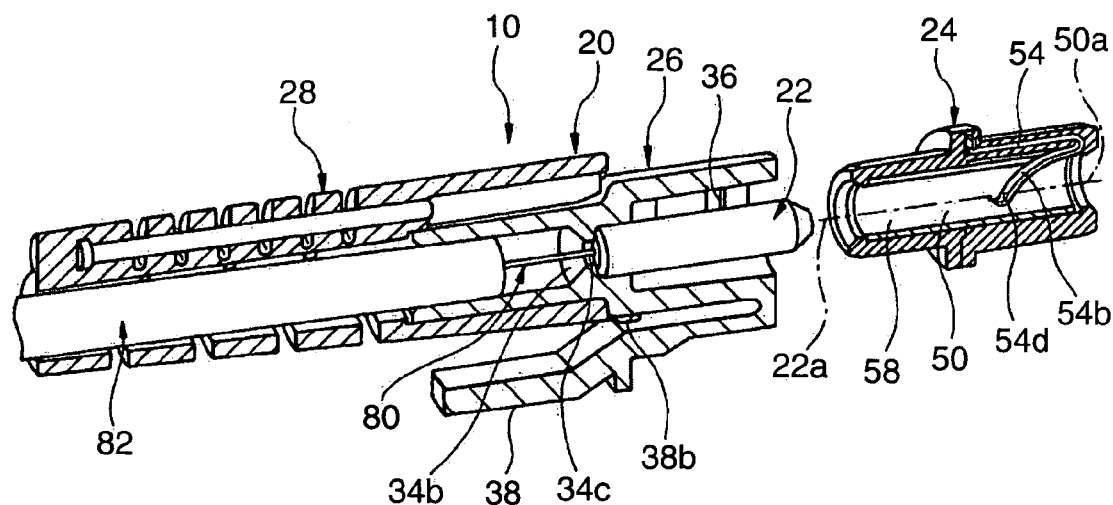
Figure 5:
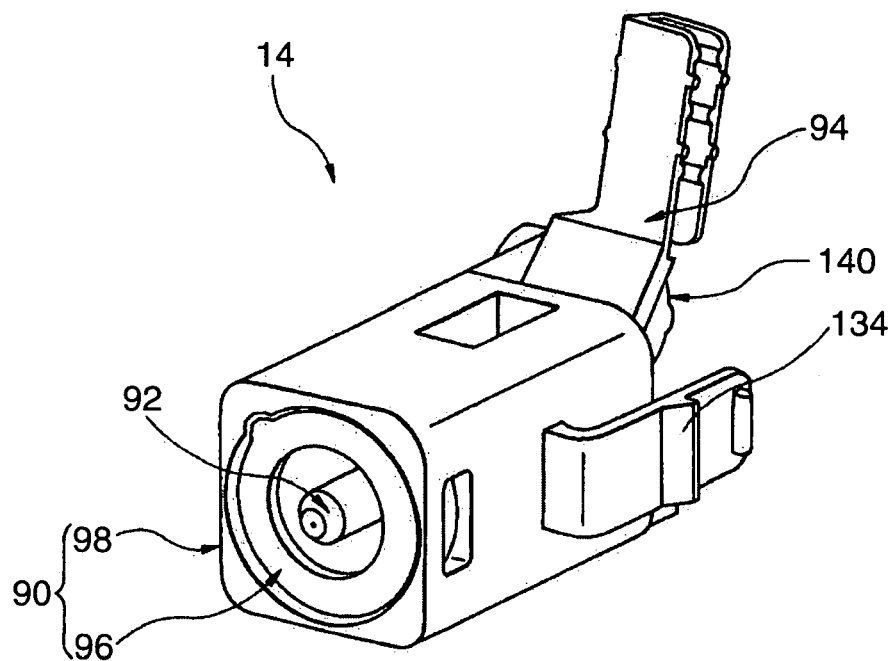
FIG. 5 is a perspective view of an optical connector according to another embodiment of the present invention.
Figure 6:
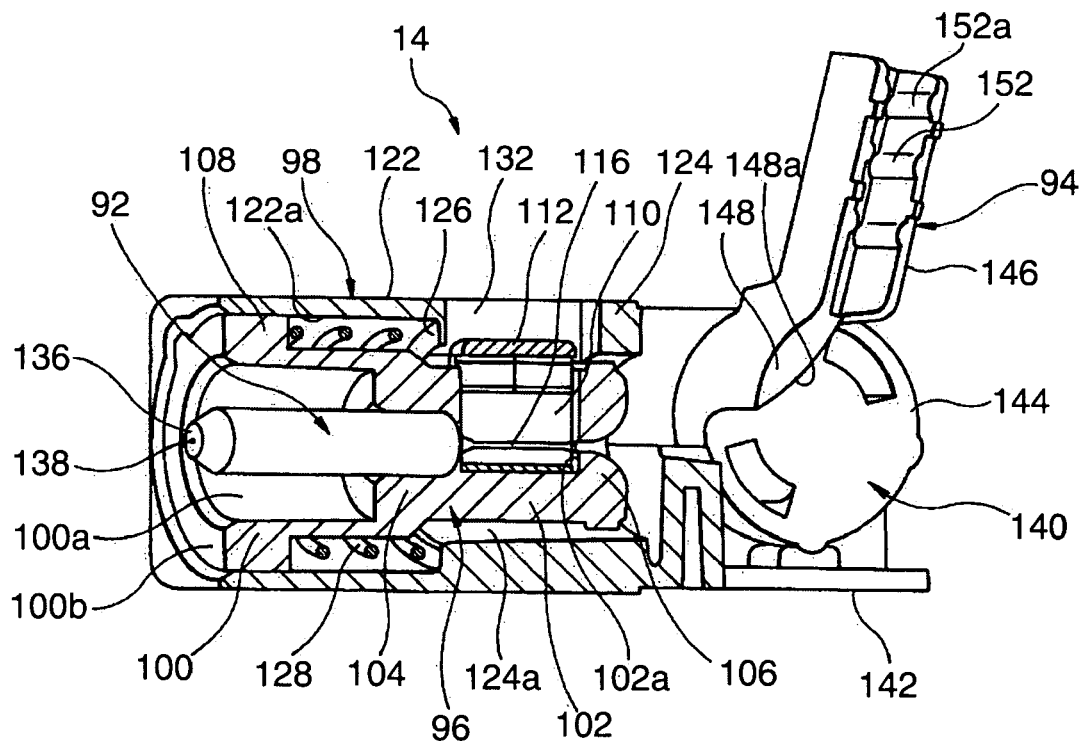
FIG. 6 is a vertical sectional perspective view of the optical connector of FIG. 5.
Figure 7:
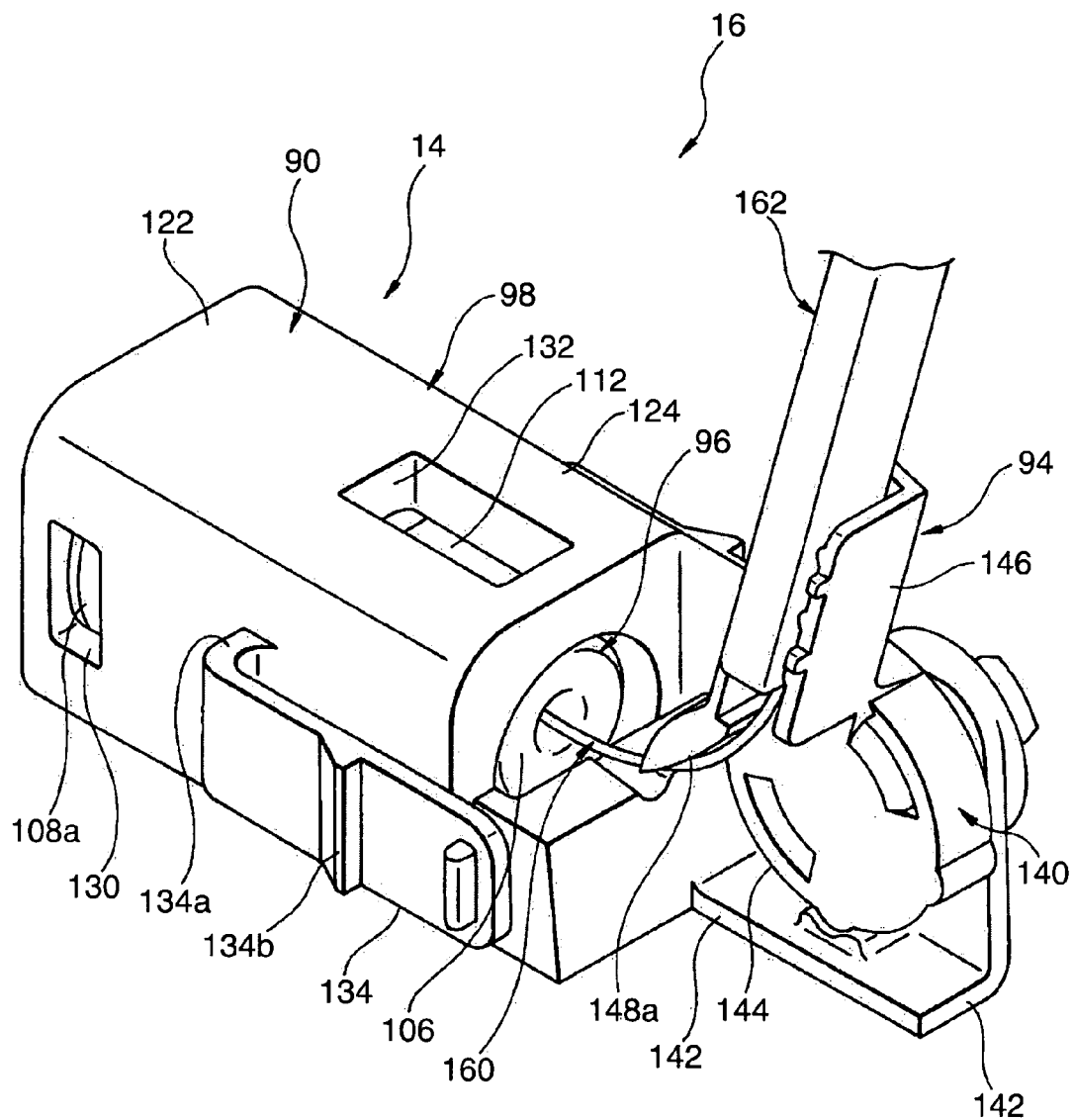
FIG. 7 is a perspective view of an optical fiber with a connector according to another embodiment of the present invention having the optical connector of FIG. 5.
Figure 8:
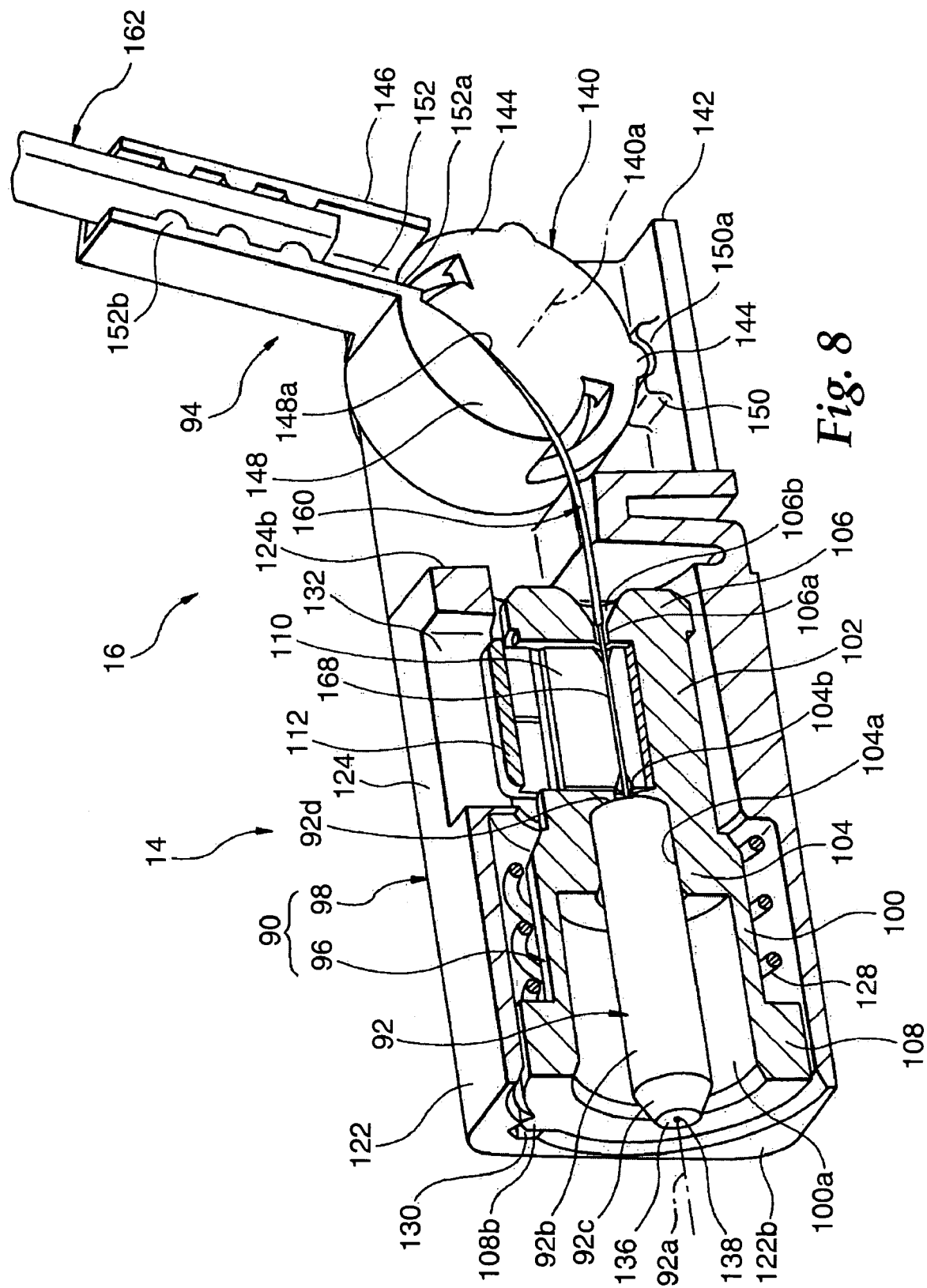
FIG. 8 is a vertical sectional perspective view of an optical fiber with a connector of FIG. 7.
Figure 9:
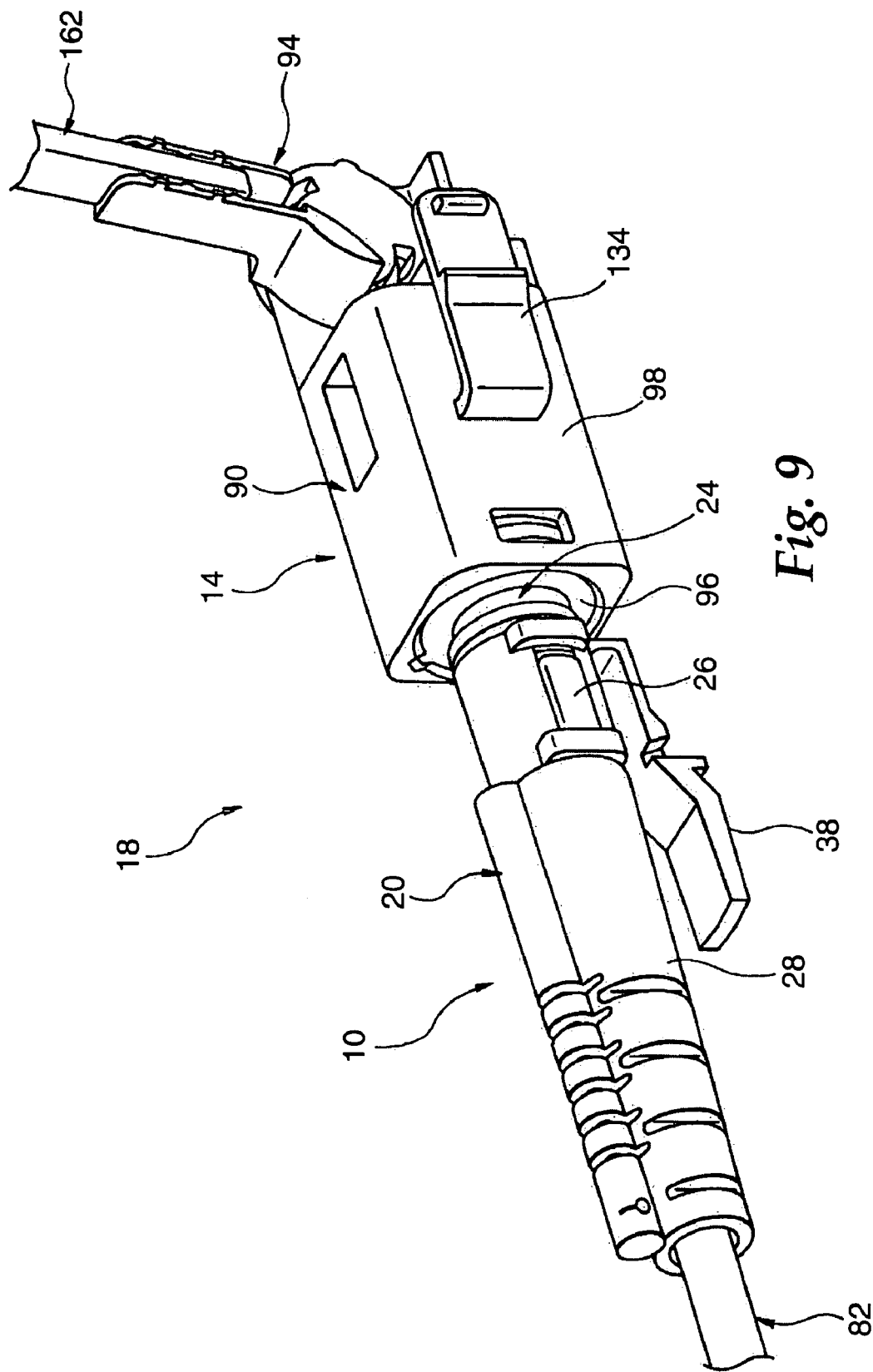
FIG. 9 is a perspective view of an optical fiber connecting device according to an embodiment of the present invention provided with the optical connector of FIG. 1 and FIG. 5.
Figure 10:
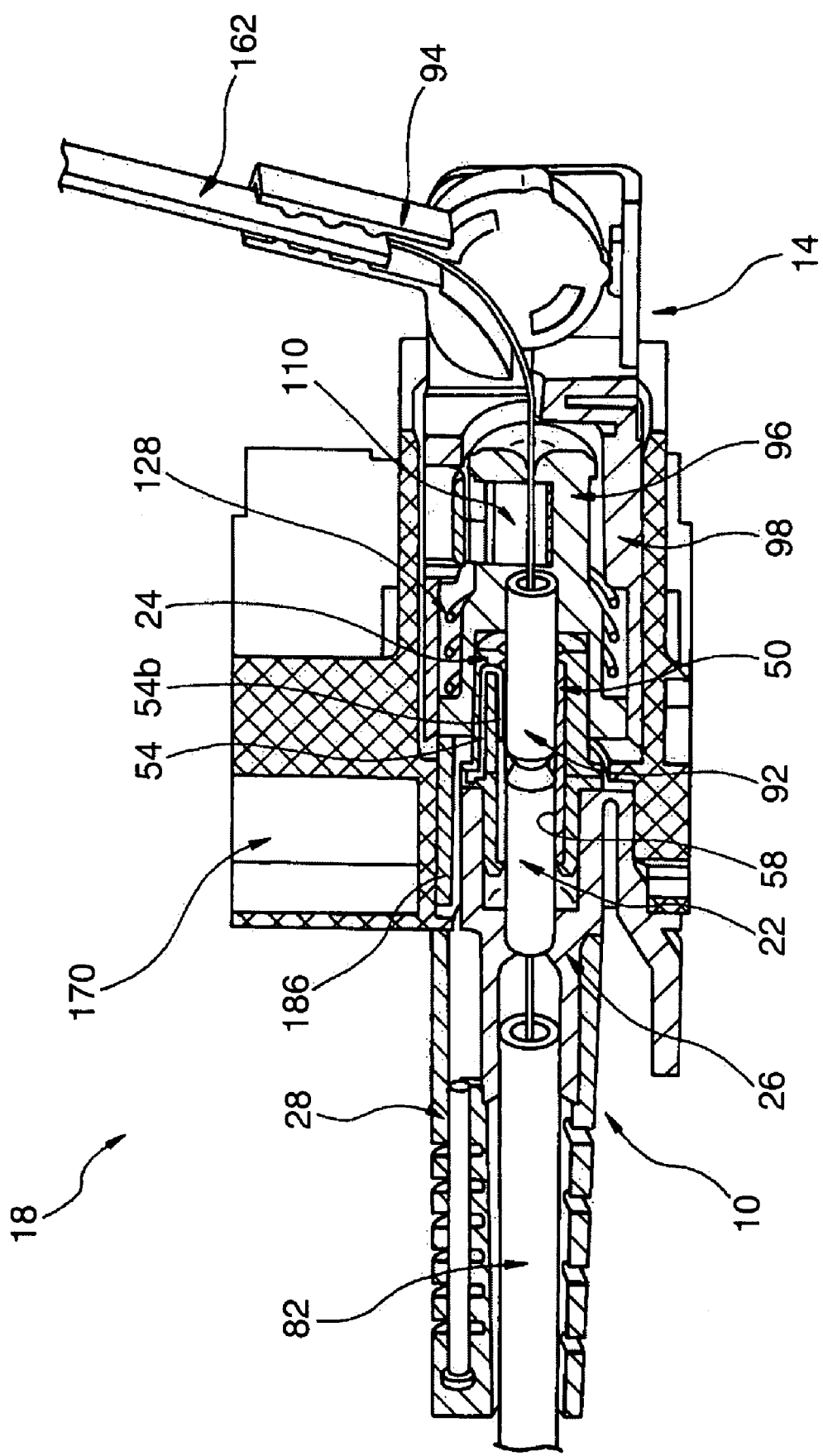
FIG. 10 is a vertical sectional perspective view of the time of use of the optical fiber connecting device of FIG. 9.

FIG. 1 and FIG. 2 are views showing a plug-type optical connector 10 according to an embodiment of the present invention, FIG. 3 and FIG. 4 are views showing an optical fiber 12 according to an embodiment of the present invention provided with an optical connector, FIG. 5 and FIG. 6 are views of a socket-type optical connector 14 according to another embodiment of the present invention, FIG. 7 and FIG. 8 are views showing an optical fiber 16 according to another embodiment of the present invention provided with an optical connector 14, and FIG. 9 and FIG. 10 are views of an optical fiber connecting device 18 according to an embodiment of the present invention provided with a plug-type optical connector 10 and a socket-type optical connector 14. The optical connector 10 and 14 and the optical fiber connecting device 18 can connect the optical fibers of a pair of coated optical fibers from which the coatings have been removed in a state with the front end faces made to abut against each other coaxially.

As shown in FIG. 1 to FIG. 4, the plug-type optical connector 10 according to an embodiment of the present invention is used attached to an end of an optical transmission line member including a coated optical fiber and is comprised of a body 20, a ferrule 22 to be set secured at a predetermined position of the body 20, and an aligning sleeve member 24 supported at a predetermined position with respect to the ferrule 22 on the body 20. The body 20 is provided with a hollow cylindrical plug housing 26 securely supporting the ferrule 22 and a hollow cylindrical boot 28 securely coupled to the plug housing 26 adjoining it in the axial direction. The plug housing 26 and boot 28 can be produced from a suitable plastic material.

The plug housing 26 of the body 20 is provided integrally with a substantially cylindrical first part 30 open at one end in the axial direction and a substantially cylindrical second part 32 open at the other end in the axial direction. The first part 30 defines a first recess 30a by its cylindrical inner circumference, while the second part 32 defines a second recess 32a by its cylindrical inner circumference. The first recess 30a and the second recess 32a have formed between them integrally with the first and second parts 30 and 32 a ring-shaped wall 34 having a center through hole communicating the two. The center through hole of the ring-shaped wall 34 includes a large diameter cylindrical insertion hole 34a at the first recess 30a side, a guide groove 34b expanding frustoconically at the second recess 32a side, and a small diameter cylindrical through hole 34c communicating the insertion hole 34a and guide groove 34b. The first recess 30a, second recess 32a, insertion hole 34a, guide groove 34b, and through hole 34c are aligned coaxially with each other.

The first part 30 of the plug housing 26 is formed with a pair of engagement holes 36 at facing positions in the diametrical direction near the open end 30b. The engagement holes 36 and open end 30b are provided between them with a guide face 36a adjoining the inner circumference of the first part 30. The first part 30 of the plug housing 26 further has a crank-shaped latch lever 38 having a base end 38a formed integrally adjoining the open end 30, having a length reaching the second part 32 at the outside of the plug housing 26, and extending in a cantilever fashion. The latch lever 38 bends elastically about the base end 38a to be able to move back and forth on the first part 30 in a direction approaching and moving away from the plug housing 26. The approximate center of the latch lever 38 in the longitudinal direction is formed at its two side edges with a pair of engagement recesses 38b.

The boot 28 of the body 20 is integrally provided with a substantially cylindrical first part 40 open at one end in the axial direction and a substantially cylindrical second part 42 open at the other end in the axial direction. The first part 40 defines a first recess 40a by its cylindrical inner circumference, while the second part 42 defines a second recess 42a by its cylindrical inner circumference. The first recess 40a and the second recess 42a are communicated coaxially through a slight step difference. The first part 40 of the boot 28 securely holds the first recess 40a and the second part 32 of the plug housing 26 by press-fitting or adhesion. The second part 42 of the boot 28 has flexibility for being relatively easily bent by external force while maintaining a state of communication of the second recess 42a with the second recess 32a of the second part 32 of the plug housing 26 held in the first recess 40a. The second part 42 of the boot 28 is provided inside it with a flexible wire 44 for holding any bent shape.

Figure 11A:
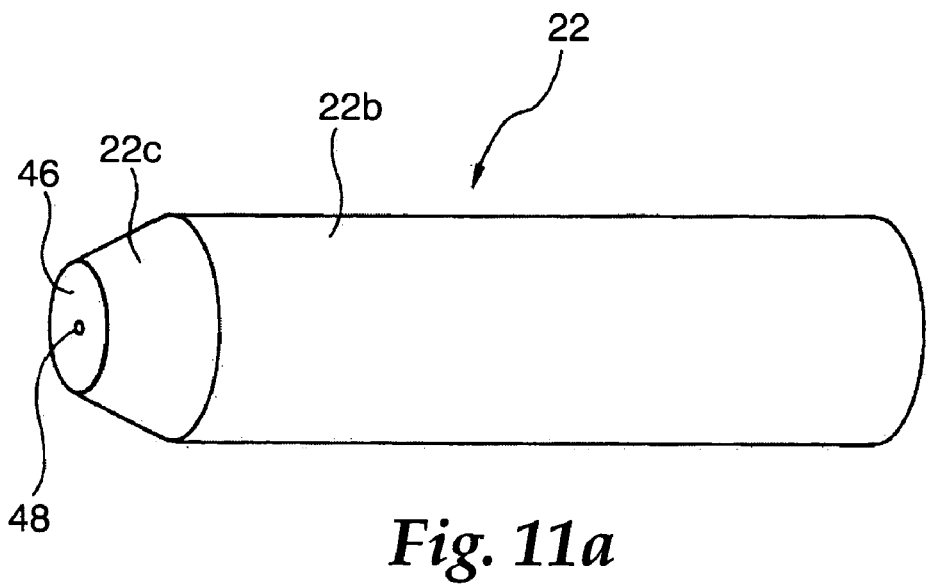
FIG. 11 shows views of a ferrule attached to the optical connector of FIG. 1, wherein (a) is a perspective view and (b) is a vertical sectional view.
Figure 11B:
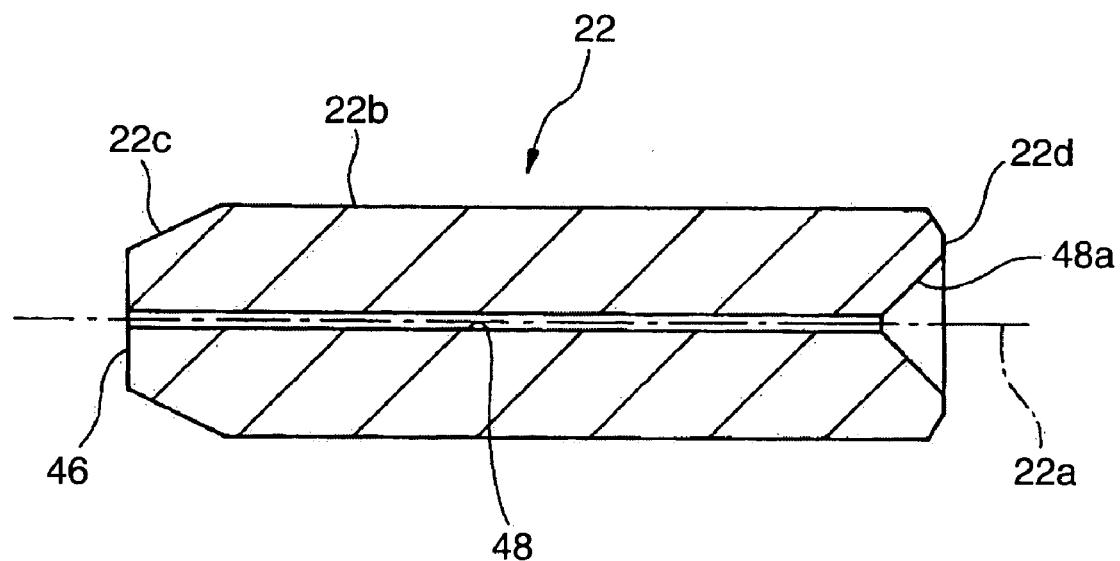

The ferrule 22 of the optical connector 10, as shown alone in FIG. 11, is a cylindrical member formed with one through hole for holding a fiber along its center axis 22a. Overall, it functions as a single-fiber centering part having a cylindrical outer circumference 22b. The ferrule 22 is provided with an abutting end face 46 at one end in the axial direction extending flat substantially perpendicularly with the center axis 22a and a fiber holding channel 48 opening at the center of the abutting end face and extending straight along the center axis 22a. The abutting end face 46 is communicated with a cylindrical outer circumference 22b through a tapered surface 22c. The fiber holding channel 48 is expanded by a tapered guide face 48a at the opposite side to the abutting end face 46 and opens at a ring-shaped end face 22d at the other end in the axial direction.

The ferrule 22 is secured to the insertion hole 34a of the ring-shaped wall 34 of the plug housing 26 at the part near the ring-shaped end face 22d by press-fitting or adhesion. In this state, the main length part of the ferrule 22 is arranged substantially coaxially with a clearance in the first recess 30a of the first part 30 of the plug housing 26. Further, the abutting end face 46 of the ferrule 22 is positioned projecting out slightly from the open end 30b of the first part 30 of the plug housing 26. Note that the ferrule 22 can be made from ceramic, plastic, metal, etc.

Figure 12A:
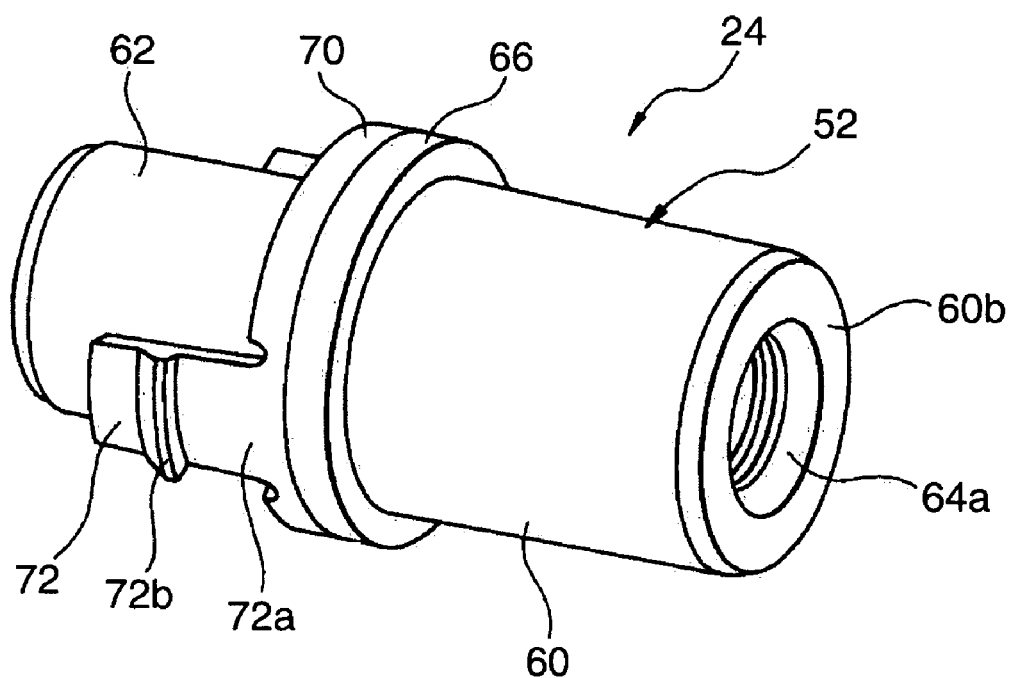
FIG. 12 shows views of an aligning sleeve member attached to the optical connector of FIG. 1, wherein (a) is a perspective view and (b) is a vertical sectional perspective view.
Figure 12B:
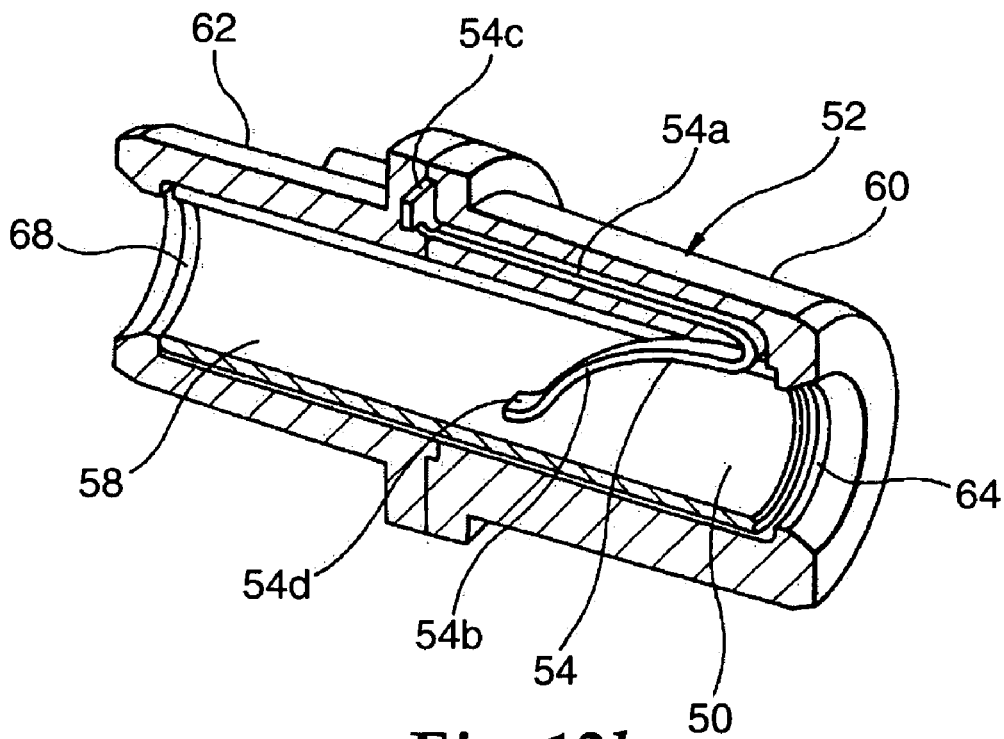
Figure 13A:
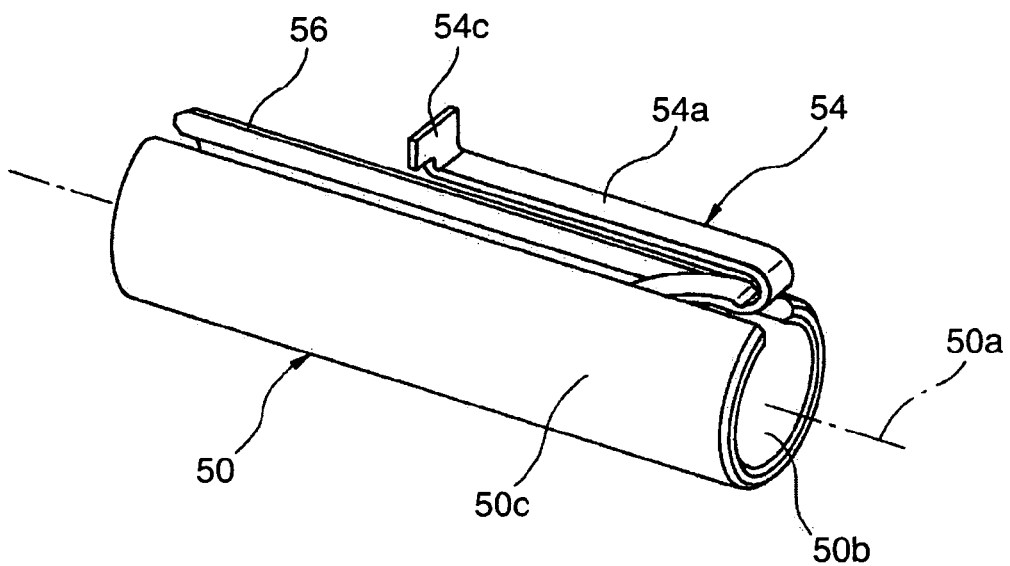
FIG. 13 shows (a) a perspective view of a slotted sleeve and movable shutter of the aligning sleeve member of FIG. 12 and (b) a vertical sectional perspective view of a sleeve holding section.
Figure 13B:
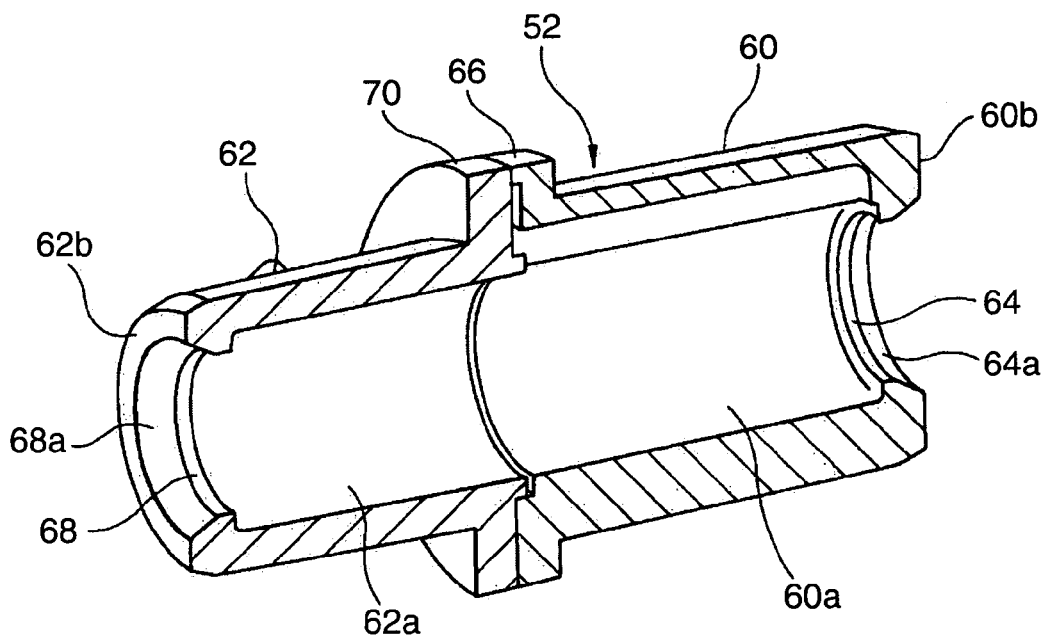

The aligning sleeve member 24 of the optical connector 10, as shown in FIG. 12 and FIG. 13, is provided with a hollow cylindrical slotted sleeve 50, a hollow cylindrical sleeve holder 52 holding the slotted sleeve 50, and a movable shutter 54 supported by the sleeve holder 52 and extending into the slotted sleeve 50. The slotted sleeve 50 of the aligning sleeve member 24 is comprised of a metal sheet or other elastic sheet member bent in a cylindrical shape, has a uniform inner circumference 50b and outer circumference 50c at the entire part defining the center axis 50a, and has a slit 56 extending across the entire length in the axial direction at one location in the peripheral direction of the inner and outer circumferences 50b and 50c. The slotted sleeve 50 can be uniformly expanded and contracted in inside diameter of the bore 58 defined by the inner circumference 50b under its own elastic recovery force.

The sleeve holder 52 of the aligning sleeve member 24 is provided with a substantially cylindrical first part open at one end in the axial direction and a substantially cylindrical second part 62 open at the other end in the axial direction. The first part 60 defines a first recess 60a by its cylindrical inner circumference, while the second part 62 defines a second recess 62a by its cylindrical inner circumference. The first recess 60a and second recess 62a have the same inside diameter and are communicated with each other without any step difference. The first part 60 of the sleeve holder 52, as explained later, functions as an counterpart connector engagement section projecting out in a plug shape at the outside of the body 20 and complementarily engaging with the socket-shaped engagement section of the counterpart connector at the time of connection of the optical connector 10 and its counterpart connector (for example, the optical connector 14).

The first part 60 of the sleeve holder 52 has a ring-shaped ridge 64 having a tapered guide face 64a adjoining its open end 60b. A ring-shaped flange 66 is provided projecting outward in the diametrical direction at a position away from the open end 60b. Similarly, the second part 62 has a ring-shaped ridge 68 having a tapered guide face 68a adjoining its open end 62b provided projecting inward in the diametrical direction. A ring-shaped flange 70 is provided projecting outward in the diametrical direction at a position away from the open end 62b. In the illustrated embodiment, the first part 60 and the second part 62 are made as separate members and are combined in a positional relationship where the ring-shaped flanges 66 and 70 are made to adjoin each other.

The second part 62 of the sleeve holder 52 further has a pair of engagement pieces 72 having integrally formed base ends 72a at facing positions in the diametrical direction on the ring-shaped flange 70 and extending in a cantilever fashion along the outer circumference of the second part 62. The engagement pieces 72 can elastically bend about the base ends 72a so as to move back and forth in directions approaching and moving away from the sleeve holder 52 on the second part 62. The approximate centers of the engagement pieces 72 in the longitudinal direction are formed at their outside surfaces with engagement projections 72b. The sleeve holder 52 holds the slotted sleeve 50 in the no-load state in the first and second recesses 60a and 62a of the first and second parts 60 and 62 with suitable clearance. At this time the slotted sleeve 50 is held by the ring-shaped ridges 64 and 68 of the first and second parts 60 and 62 so as not to detach from the first and second recesses 60a and 62a. Note that the sleeve holder 52 can be made from a suitable plastic material.

The movable shutter 54 of the aligning sleeve member 24 is comprised of a metal sheet or other elastic sheet member bent into an approximate J-shape and has a support part 54a extending straight and an arm part 54b extending bent somewhat shorter than the support part 54a. The movable shutter 54 has an attachment piece 54c formed at an end of the support part 54a and securely gripped between the first part 60 and second part 62 of the sleeve holder 52. It is supported in a cantilever fashion at the sleeve holder 52 in the state with the support part 54a extended in the axial direction along the inner circumference of the first part 60. In this state, the arm part 54b of the movable shutter 54 passes through the slit 56 of the slotted sleeve 50 to extend into the bore 58. The end 54d is arranged at a position superposed over the center axis 50a of the slotted sleeve 50. The arm part 54b of the movable shutter 54 can elastically bend about the location connected with the support part 54a to move back and forth in directions approaching and moving away from the slit 56 of the slotted sleeve 50. That is, the arm part 54b of the movable shutter 54 is set passively displaceable at the bore 58 of the slotted sleeve 50.

The aligning sleeve member 24 is detachably attached to the body 20 by the second part 62 of the sleeve holder 52 being held in the first part 30 of the plug housing 26 of the body 20. At this time, as the second part 62 of the sleeve holder 52 is inserted into the first recess 30a of the first part 30 of the plug housing 26, the pair of engagement pieces 72 of the sleeve holder 52 are pressed by the corresponding guide walls 36a of the first part 30 and bent inward in the diametrical direction. Finally, the engagement projections 72b of the engagement pieces 72 are snapped into the corresponding engagement holes 36 of the first part 30. Along with this, the main length part of the ferrule 22 secured to the plug housing 26 passes through the open end 62b of the second part 62 of the sleeve holder 52 and is inserted into the bore 58 of the slotted sleeve 50. As a result, the aligning sleeve member 24 is arranged at a suitable position on the plug housing 26 of the body 20.

In the state with the aligning sleeve member 24 arranged at a suitable position with respect to the body 20, part of the bore 58 of the slotted sleeve 50 of a length substantially corresponding to the second recess 62a of the sleeve holder 52 holds any length of the ferrule 22 adjoining the abutting end face 46. In this state, the slotted sleeve 50 contacts the cylindrical outer circumference 22b of the ferrule 22 and is elastically pushed open slightly. The ferrule 22 is centered and supported at a predetermined position by its elastic recovery force. That is, in this state, the center axis 22a of the ferrule 22 is arranged securely precisely matched with the center axis 50a of the slotted sleeve 50 and the slotted sleeve 50 is supported at a predetermined centering position with respect to the ferrule 22.

Further, in this suitable attachment position, the movable shutter 54 of the aligning sleeve member 24 is arranged with the end 54d of the arm part 54b moved away from the abutting end face 46 of the ferrule 22 and superposed on the center axis 22a in the front in the axial direction of the opening of the fiber holding channel 48. Therefore, the movable shutter 54 can block light emitted through the ferrule 22 from reaching the position of the open end 60b by the arm part 54b projecting out into the bore 58 of the slotted sleeve 50 between the abutting end face 46 of the ferrule 22 and the open end 60b of the first part 60 of the sleeve holder 52.

When detaching the aligning sleeve member 24 from the body 20, the engagement projections 72b of the two engagement pieces 72 of the sleeve holder 52 are forcibly pushed into the engagement holes 36 from the outside of the first part 30 of the plug housing 26 to disengage the snap engagement between the engagement projections 72b and the engagement holes 36. In this state, by pulling out the aligning sleeve member 24 from the plug housing 26, the slotted sleeve 50 detaches from the ferrule 22 and the aligning sleeve member 24 is detached from the body 20. Note that the snap engagement of the engagement projection 72b and engagement hole 36 for securely setting the aligning sleeve member 24 on the body 20 is advantageous in that it can be disengaged manually without using a special tool, but it is desirable that the aligning sleeve member 24 have enough of a reliability not to unintentionally detach from the body 20 at the time of connection/disconnection of the optical connector 10 and counterpart connector (for example, the optical connector 14).

The above plug-type optical connector 10 can be attached to an end of an optical fiber cord 82 including a coated optical fiber 80 in a state with the aligning sleeve member 24 attached to the body 20 so as to form an optical fiber 12 with a connector (FIG. 3 and FIG. 4). Here, the optical fiber cord 82 is end-treated in advance, as shown in FIG. 14(a), by removing the plastic sheath 84 and tension-bearing member (not shown) from a desired length of the end to expose the coated optical fiber 80, by removing the coating 86 from a desired length of the front end of the coated optical fiber 80 to expose the optical fiber 88, and cutting the exposed optical fiber 88 by a special cutting tool into at least a length substantially corresponding to the fiber holding channel 48 of the ferrule 22.

The thus end-treated optical fiber cord 82 is inserted into the boot 28 of the body 20 of the optical connector 10, whereby the optical fiber 88 exposed at the end passes through the guide groove 34b and through hole 34c of the ring-shaped wall 34 of the plug housing 26 and is passed from the guide face 48a of the ferrule 22 set securely in the first recess 30a into the fiber holding channel 48. Further, at the point of time when the axial end face 88a of the optical fiber 88 reaches a predetermined position adjoining the abutting end face 46 of the ferrule 22, for example, at least one of the optical fiber 88 and the coating 86 of the coated optical fiber 80 is secured by an adhesive to at least one of the ferrule 22 and plug housing 26 (through hole 34c), and the sheath 84 of the optical fiber cord 82 is secured by an adhesive to the second recess 32a of the plug housing 26. In this way, the end of the optical fiber cord 82 is fit with an optical connector 10, whereby the optical fiber 12 with a connector is completed.

The optical connector 10 having the above configuration is equipped with an aligning sleeve member 24 holding in the bore 58 a part of the ferrule 22 set in the body 20 including the abutting end face 48, so it is possible to prevent in advance contact by the hand and deposition of dirt on the abutting end face 48 of the ferrule 22. The aligning sleeve member 24 can be attached to and detached from the body 20, so when not cleaning the area surrounding the ferrule 22, cleaning is easy by detaching the aligning sleeve member 24 from the body 20. Note that these actions and effects are exhibited even when the movable shutter 54 is not provided.

Further, according to the optical connector 10, the aligning sleeve member 24 includes the movable shutter 54, so while the optical connector 10 is not connected with the other optical connector in the state attached to the coated optical fiber 80, light emitted from the optical fiber 88 through the ferrule leaking outward from the open end 30b of the plug housing 26 is reliably prevented by the movable shutter 54. The movable shutter 54 is set in the bore 58 of the aligning sleeve member 24, so there is no danger of unintentional operation of the movable shutter 54. Further, since the aligning sleeve member 24 supported at the ferrule 22 is provided with the movable shutter 54, it is possible to easily impart a light-blocking function regardless of the external shape of the optical connector. In this way, the optical connector 10 has a superior dirt-proofing function and light-blocking function.

Further, the optical fiber 12 with a connector having the above configuration has a superior dirt-proofing function and light-blocking function in the optical connector 10. Therefore, the optical fiber 12 with a connector can exhibit a high degree of safety and contribute to the construction of an optical transmission line with a high safety and reliability for even users poor in knowledge and skill such as general homes. Note that the optical connector 10 can be provided with a plurality of ferrules 22 and a plurality of aligning sleeve members 24 corresponding to the ferrules 22 so as to construct a multi-fiber optical connector.

As shown in FIG. 5 to FIG. 8, the socket-type optical connector 14 according to another embodiment of the present invention is used attached to an end of an optical transmission line member including a coated optical fiber and is comprised of a body 90, a ferrule 92 set at a predetermined position of the body 90, and a holding section 94 for securely holding the optical transmission line member having a coated optical fiber attached to the ferrule 92. The body 90 is provided with a cylindrical socket block 96 for securely supporting the ferrule 92 and a hollow cylindrical socket housing 98 for supporting the socket block 96 displaceably in the axial direction. The socket block 96 and socket housing 98 can be made from a suitable plastic material.

The socket block 96 of the body 90 is integrally provided with a substantially cylindrical first part 100 open at one end in the axial direction and a cylindrical second part 102 open at the side at the other end in the axial direction. The first part 100 defines a first recess 100a by its cylindrical inner circumference, while the second part 102 defines a second recess 102a by the inner circumference of that substantially block shape. The first recess 100a and the second recess 102a have between them a ring-shaped wall 104 having a center through hole passing through the two formed integrally with the first and second parts 100 and 102. The center through hole of the ring-shaped wall 104 includes a large diameter cylindrical insertion hole 104a at the first recess 100a side and a small diameter cylindrical through hole 104 at the second recess 102a side. The second part 102 is further provided with a rear end wall 106 having a center through hole communicating with the second recess 102a and set at the other end in the axial direction of the socket block 96. The center through hole of the rear end wall 106 includes a small diameter cylindrical through hole 106a at the second recess 102a side and a guide groove 106b expanding frustoconically toward the outer surface. The first recess 100a, the insertion hole 104a, the through hole 104b, the through hole 106a, and the guide groove 106b are aligned coaxially with each other.

The first part 100 of the socket block 96 is formed with a ring-shaped flange 108 projecting outward in the diametrical direction adjoining the open end 100b. Further, a predetermined position of the ring-shaped flange 108 is formed with a catch 108a and a twist-stop 108b projecting out locally outward in the diametrical direction. The second part 102 of the socket block 96 holds an open/closable fiber securing member 110 securely gripping the optical fiber stripped of its coating and an actuating member 112 operating to make the fiber securing member 100 open and close suitably combined in the second recess 102a.

As shown in FIG. 15, the fiber securing member 110 has a mode in which it folds into two along its center axis a sheet member formed into a predetermined shape from aluminum or another ductile material. The folded fiber securing member 110 is provided with a pair of flaps 114 arranged facing each other across a butterfly edge 110a along the fold. The facing surfaces of these flaps 114 are formed with open/closeable gripping surfaces 114a securely gripping the optical fiber. In the illustrated embodiment, corresponding positions of the gripping surfaces 114a of the two flaps 114 are formed with straight supporting grooves 116 (for example, V-section grooves) for gripping the optical fiber at a predetermined positions parallel to the butterfly edge 110a.

The pair of flaps 114 of the fiber securing member 110 are designed to move back and forth, that is, open and close, about the butterfly edge 110a along with elastic deformation of the material at the area of the butterfly edge 110a. Normally, the fiber securing member 110 is placed in the open position where the two flaps 114 are moved away somewhat from the gripping surfaces 114a (FIG. 15). From the open position, by applying external force to the two flaps 114 in a direction bringing them closer, the member displaces against the elastic recovery force of the butterfly edge 110a to the closed position where the gripping surfaces 114a come into contact. When the fiber securing member 110 is in the open position, smooth insertion and removal of the optical fiber to and from the supporting groove 116 are allowed, while when the fiber securing member 110 is in the closed position, the optical fiber held between the pair of supporting grooves 116 is strongly securely gripped receiving the pressure from the two gripping surfaces 114a. Note that the fiber securing member 110 can be formed suitably adjusting the width of the supporting grooves 116 so as to securely grip an optical fiber with the coating between the two supporting grooves 116.

The actuating member 112 is a lid-shaped member made of an integrally molded piece of for example a plastic material and is provided with a pair of holding walls 120 defining a recess 118 of dimensions able to hold the two flaps 114 of the fiber securing member 110. These holding walls 120 face each other substantially in parallel across a predetermined space and have facing surfaces formed as stepped surfaces having primary pressing surfaces 120a at the open (in figure, bottom) side of the recess 118 and secondary pressing surfaces 120b at the inner side of the recess 118. Therefore, the recess 118 is formed with a relatively broad open side area defined by the two primary pressing surfaces 120a and a relatively narrow inner side area defined by the two secondary pressing surfaces 120b.

The fiber securing member 110 is secured in the second recess 102a of the second part 102 of the socket block 96 with the butterfly edge 110a facing the inner side in a state enabling the above opening/closing operation. If securing the fiber securing member 110 at a suitable position of the second recess 102a of the socket block 96, the two supporting grooves 116 are arranged so as to be able to be aligned coaxially with respect to the pair of through holes 104b and 106a of the socket block 96. The actuating member 112 is movably attached to the second recess 102a so as to complementarily block the open area of the second part 102 of the socket block 96. At this time, the actuating member 112 holds the two flaps 114 of the fiber securing member 110 in the recess 118. The two holding walls 120 support the two flaps 114 by holding them from the outside in stages by the pressing surfaces 120a and 120b. While moving from a provisional attachment position (FIG. 6 and FIG. 8) to the final attachment position with respect to the socket block 96, the actuating member 112 operates to displace the fiber securing member 110 from the open position to the closed position by applying pressure to the two flaps 114 of the fiber securing member 110 from the two holding walls 120 in a direction bringing the gripping surfaces 114a into close contact.

The socket housing 98 of the body 90 is provided integrally with the cylindrical first part 122 open at one end in the axial direction and the cylindrical second part 124 open at the other end in the axial direction. The first part 122 defines a first recess 122a by its cylindrical inner circumference, while the second part 124 defines a second recess 124a by its cylindrical inner circumference. The first recess 122a and the second recess 124a communicate with each other coaxially through a step difference (shoulder 126). The socket housing 98 holds in the first recess 122a of the first part 122 the first part 100 of the socket block 96 displaceably in the axial direction and holds in the second recess 124a of the second part 124 the second part 102 of the socket block 96 displaceably in the axial direction.

The first recess 122a of the socket housing 98 further holds a compression helical spring 128 interposed between the shoulder 126 and ring-shaped flange 108 of the socket block 96 in a compressible state by an arrangement surrounding the first part 100 of the socket block 96. The compression helical spring 128 elastically biases the socket block 96 in a direction pushing it outward from the open end 122b of the first part 122 of the socket housing 98 from an open end 122. Further, the first part 122 of the socket housing 98 is formed with a plurality of recesses 130 complementarily holding a catch 108a and twist-stop 108b provided at the ring-shaped housing 108 of the socket block 96 at a predetermined position near the open end 122b. Due to this, the socket block 96 can displace across a predetermined distance in only the axial direction under the bias force of the compression helical spring 128.

The second part 124 of the socket housing 98 is formed with an operating window 132 open to the side at a position corresponding to the actuating member 112 set at the second part 102 of the socket block 96. The operating window 132 allows insertion of a suitable tool for moving the actuating member 112 from the above-mentioned provisional attachment position to the final attachment position. The second part 124 of the socket housing 98 further has a pair of latch levers 134 having base ends 134a integrally formed at facing positions in the diametrical direction on the outer surface at the boundary area with the first part 122 and extending in a cantilever fashion along the outer surface of the second part 124. The latch levers 134 can elastically bend about the base ends 134a to move back and forth in directions approaching and moving away from the socket housing 98 on the second part 124. The approximate centers in the longitudinal directions of the latch levers 134 are formed with engagement projections 134b at their outer surfaces.

The ferrule 92 of the optical connector 14 has substantially the same configuration as the ferrule 22 of the optical connector 10. That is, the ferrule 92 is provided with an abutting end face 136 at one end in the axial direction extending flat substantially perpendicular to the center axis 92 and a fiber holding channel 138 opening at the center of the abutting end face 136 and extending straight along the center axis. The abutting end face 136 is communicated with a cylindrical outer circumference 92b through a tapered surface 92c.

The ferrule 92 is secured at the insertion hole 104a of the ring-shaped wall 104 of the socket block 96 at a part near the ring-shaped end face 92d at the opposite side to the abutting end face 136 by press-fitting or adhesion. In this state, the main length part of the ferrule 92 is arranged in the first recess 100a of the first part 100 of the socket block 96 substantially coaxially with a space. Further, the abutting end face 136 of the ferrule 92 is positioned projecting outward slightly from the open end 100b of the first part 100 of the socket block 96.

The ferrule 92 secured to the socket block 96 can displace across a predetermined distance in the axial direction with respect to the socket housing 98 together with the socket block 96. At the front end position where the socket block 96 leans to the open end 122b side of the first part 122 of the socket housing 98 due to the bias force of the compression helical spring 128, the abutting end face 136 of the ferrule 92 is arranged projecting slightly outward from the open end 122b of the socket housing 98. Further, at the rear end position where the socket block 96 leans to the open end 124b side of the second part 124 of the socket housing 98 against the bias force of the compression helical spring 128, the abutting end face 136 of the ferrule 92 is arranged on an imaginary plane substantially the same as the open end 122b of the socket housing 98. Due to this configuration, when connecting the optical connector 14 with the other connector (for example, optical connector 10), in the separately providing aligning sleeve member (for example, aligning sleeve member 24 of optical connector 10), it is possible to make the abutting end faces of the ferrules of the two connectors abut against each other by the spring bias force of the compression helical spring 128 and connect them in an end face abutting state with the pair of coated optical fibers centered with a high accuracy.

The holding section 94 of the optical connector 14 is provided with a holding member 140 arranged at a position adjoining the second part 124 of the socket housing 98 of the body 90 and separated by exactly a predetermined distance from the open end 124b (or ring-shaped end face 92d of the ferrule 92 secured to the socket block 96). The holding member 140 has a rotational axis 140a extending in a direction substantially perpendicular to the center axis 92a of the ferrule 92 secured to the socket block 96 on a third part 142 extending integrally to a side opposite the first part 122 from the second part 124 of the socket housing 98 and is rotatably provided. Alternatively, the holding member 140 can be formed integrally (that is, securely) with the third part 142 of the socket housing 98.

The holding member 140 is for example comprised of an integral molded piece of a plastic resin and is provided with a base plate part 144 having a disk shape centered on the rotational axis 140a and a U-shaped extension part 146 extending from the base plate part 144 outward in a radial shape. The base plate part 144 of the holding member 140 is provided with a bulge 148 projecting in the rotational axis direction at the substantially bow-shaped area not including the rotational axis 140a. The bulge 148 has at the surface at the rotational axis 140a side a coated fiber guide face 148a bent bulging outward in an arc shape by a predetermined radius of curvature slightly larger than the minimum radius of curvature prescribed for the coated optical fiber to which the optical connector 14 is to be attached. Further, the base plate part 144 has a plurality of projections projecting out locally on the outer circumference at predetermined center angle positions at the side opposite to the bulge 148. Each projection 144a is fit in an engagement groove 150a on a base seat 150 formed at a predetermined position of the third part 142 of the socket housing 98 along with the slight elastic deformation of the related group of components.

Figure 16A:
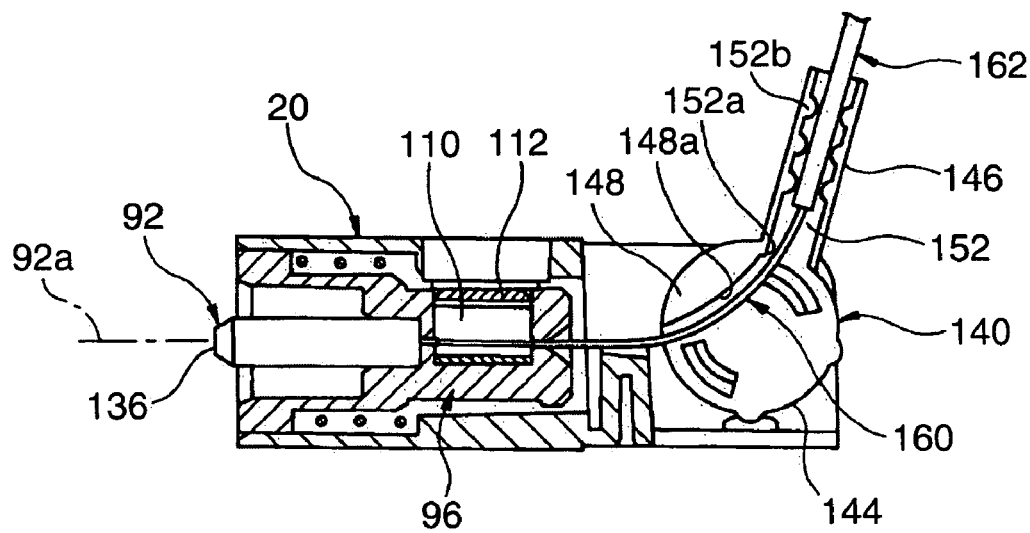
FIG. 16 shows explanatory views of the operation of the holding section attached to the optical connector of FIG. 5, wherein (a) shows a functional position and (b) shows a nonfunctional position.

The extension part 146 of the holding member 140 is formed with a holding groove 152 able to hold the optical transmission line member in a state extended straight. The holding groove 152 is substantially connected to the coated fiber guide face 148a of the bulge 148 at its base end 152a adjoining the base plate part 144 and extends in a substantially tangential direction to the arc-shaped coated fiber guide face 148a. Further, the holding groove 152 is formed at a desired location at the inner surface of the extension part 146 with a plurality of projections 152b engaging by friction with the sheath of the optical transmission line member. When the holding member 140 is at the illustrated functional position, the holding groove 152 of the extension part 146 is arranged at a position further from both of the rotational axis 140a and coated fiber guide face 148a of the bulge 148 seen from the rear end wall 106 of the socket block 96 of the body 90 (or the ring-shaped end face 92d of the ferrule 92 secured to the socket block 96) and is extended in a direction inclined by a predetermined angle with respect to the center axis 92a of the ferrule 92 (that is, the fiber holding channel 138) secured to the socket block 96 (see FIG. 16(a)). Further, at this functional position, the coated fiber guide face 148a of the bulge 148 of the base plate part 144 is arranged at a position further from the rotational axis 140a seen from the base seat 150 of the third part 142 of the socket housing 98.

Since the holding groove 152 provided at the holding member 140 has the above configuration, regardless of the position of the ferrule 92 on the socket housing 98 of the body 90, it functions to make the coated optical fiber of the optical transmission line member bend by a radius of curvature of at least a predetermined minimum radius of curvature. This bending of the coated optical fiber is based on the angle of inclination of the holding groove 152 with respect to the center axis 92a of the ferrule 92 and the distance between the holding groove 152 and ferrule 92. Further, the coated fiber guide face 148a of the bulge 148 is formed at a position in proximity to but usually not contacting the coated optical fiber bent by the holding groove 152. The coated fiber guide face 148a effectively prevents the bent coated optical fiber from ending up being bent by a radius of curvature of less than the minimum radius of curvature due to unintentional external force. Alternatively, the coated fiber guide face 148a can assist the bending action by lightly contacting the bent coated optical fiber to an extent not giving rise to tension.

Note that at the illustrated functional position, the projection 144a provided at the base plate part 144 of the holding member 140 engages with the engagement groove 150a of the base seat 150 of the socket housing 98 and obstructs unintentional rotation of the holding member 140. Further, when integrally forming the holding member 140 at the third part 142 of the socket housing 98, the base plate part 144 and extension part 146 are arranged securely in advance at the illustrated functional position.

Figure 16B:
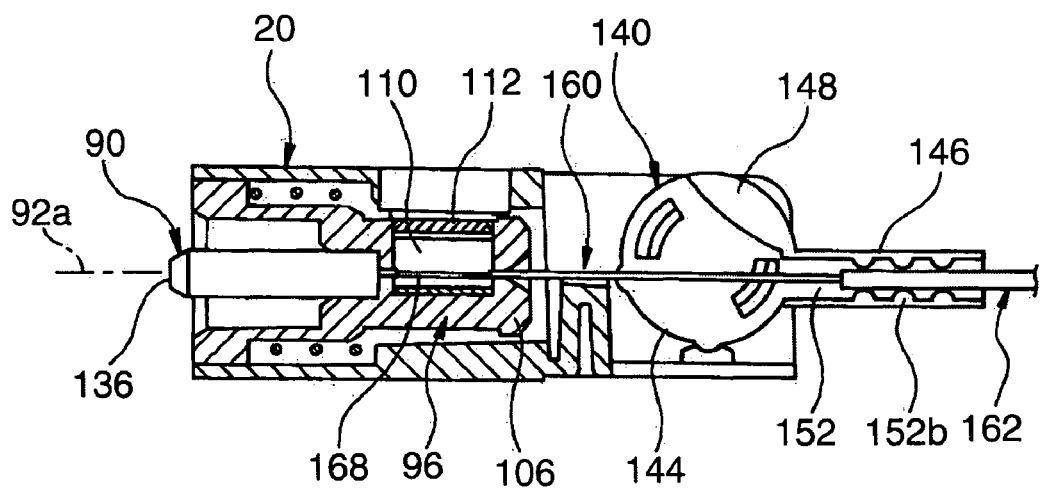

The holding member 140 set rotatably at the body 90 can be arranged at a nonfunctional position where the holding groove 152 of the extension part 146 is extended at a position further from both of the rotational axis 140*a* and the coated fiber guide face 148*a* of the bulge 148 as seen from the rear end wall 106 of the socket block 96 of the body 90 in a direction substantially parallel to the center axis 92*a* (that is, the fiber holding channel 138) of the ferrule 92 secured to the socket block 96 (or on the extension of the center axis 92*a*) (see FIG. 16(*b*)). At this nonfunctional position, another projection 144*a* provided at the base plate part 144 of the holding member 140 engages with an engagement groove 150*a* of the seat 150 of the socket housing 98 and obstructs unintentional rotation of the holding member 140. As explained later, the holding member 140 is suitably rotated between the functional position and nonfunctional position when attaching the optical connector 14 to the optical transmission line member.

The above-mentioned socket-type optical connector 14 can form an optical fiber 16 with a connector by attaching it to an end of an optical fiber cable 162 including a coated optical fiber 160 (FIG. 7 and FIG. 8). Here, this optical fiber cable 162 is end-treated in advance by, as shown in FIG. 14(*b*), removing the plastic sheath 164 and tension-bearing member (not shown) over a desired length of the end to expose the coated optical fiber 160, removing the coating 166 over a desired length of the front end of the coated optical fiber 160 to expose the optical fiber 168, and cutting the exposed optical fiber 168 by a specialized cutting tool to at least a length substantially corresponding to the fiber holding channel 138 of the ferrule 92.

The thus end-treated optical fiber cable 162 is inserted into the socket block 96 of the body 90 of the optical connector 14 from the rear end wall 106. At this time, the actuating member 112 set at the second part 102 of the socket block 96 is placed at the above-mentioned provisional attachment position, whereby the fiber securing member 110 is placed at the open position. Further, the holding member 140 of the holding section 94 are placed at the above-mentioned nonfunctional position.

Therefore, the optical fiber 168 exposed at the front end of the optical fiber cable 162 passes through the guide groove 106*b* and through hole 106*a* of the rear end wall 106 of the socket block 96, passes between the pair of support grooves 116 of the fiber securing member 110, passes through the through hole 104*b* of the ring-shaped wall 104 of the socket block 96, and is passed through the fiber holding channel 138 of the ferrule 92 secured set in the first recess 100*a*. Further, at the point of time when the axial end face 168*a* of the optical fiber 168 reaches a predetermined position adjoining the abutting end face 136 of the ferrule 92, the actuating member 112 is pushed from the provisional attachment position to the final attachment position to displace the fiber securing member 110 to the closed position and securely grip the optical fiber 168 (or coated optical fiber 160) between the pair of supporting grooves 116.

After securing the optical fiber 168 to the socket block 96 in this way, the optical fiber cable 162 is inserted into the holding groove of the extension part 146 of the holding member 140 while making the plurality of projections 152*b* bite into the sheath 164. In this state, the optical fiber cable 162 is held in a state with the optical fiber 168 extended right in a range from the abutting end face 136 of the ferrule 92 to the end of the holding groove 152 (FIG. 16(*b*)). Next, the holding member 140 is rotated from the nonfunctional position to the functional position to arrange the holding groove 152 at a position inclined by a predetermined angle with respect to the center axis 92*a* of the ferrule 92.

Along with the holding member 140 being turned from the nonfunctional position to the functional position, the coated optical fiber 160 extending along the base plate part 144 of the holding member 140 gradually approaches the coated fiber guide face 148*a* of the bulge 148. Further, when the holding member 140 reaches the functional position, the coated optical fiber 160 approaches and bends at the coated fiber guide face 148*a* of the bulge 148 as explained above in the range from the rear end wall 106 of the socket block 96 to the base end 152*a* of the holding groove 152 (FIG. 16(*a*)). At this time, due to the presence of the coated fiber guide face 148*a*, the coated optical fiber 160 bending by a radius smaller than the prescribed value of the minimum radius of curvature is reliably avoided. Further, since the optical fiber cable 162 is held at the holding groove 152 at a position far from the coated fiber guide face 148*a* seen from the rear end wall 106 of the socket block 96, when the socket block 96 displaces in the axial direction with respect to the socket housing 98 as explained above, the coated optical fiber 160 is allowed to approach the coated fiber guide face and bend slightly in a range not reaching a radius smaller than the prescribed minimum radius of curvature. In this way, the optical connector 14 is attached to the end of the optical fiber cable 162, whereby an optical fiber 16 with a connector is completed.

The optical connector 14 having the above configuration is not provided with an aligning sleeve member holding a ferrule 92 set in the body 90. Further, it is possible to hold the coated optical fiber 160 to be attached to bend by a radius of at least the prescribed value of the minimum radius of curvature behind the ferrule 92, so it is possible to effectively reduce the external dimensions in the extension direction of the ferrule 92 at the time of use while suppressing optical loss in the coated optical fiber 160. This bending of the coated optical fiber 160 is based on the arrangement preset for the holding groove 152 provided at the holding section 94, so even when performing connector attachment work for an optical fiber cable 162 at a construction site, it is possible to attach the optical connector 14 to the coated optical fiber 160 quickly and accurately. If configuring the holding section 94 from the linked holding member 140, it is possible to bend the coated optical fiber 160 by a predetermined radius of curvature without allowing twisting or tension or other stress to unintentionally concentrate at the coated optical fiber 160, so the on-site connector attachment work becomes remarkably easy.

Further, according to the optical connector 14, at the time of use, the coated optical fiber 160 extending bent along the coated fiber guide face 148*a* between the socket block 96 and holding groove 152 can bend slightly in a range not more than a radius smaller than the prescribed minimum radius of curvature near the coated fiber guide face 148*a* even when the socket block 96 moves to the rear in the axial direction against the bias force of the compression helical spring 128 when connecting the optical connector 14 with the other connector (for example, the optical connector 10). Therefore, it is possible to stably form a connection with little connection loss. Further, the configuration of the optical connector 14 not provided with an aligning sleeve member also has the effect of facilitating cleaning of the area around the ferrule. Further, the ferrule 92 and the optical fiber 168 are secured to each other by the actions of the fiber securing member 110 and actuating member 112 provided at the socket block 96, so there is no need for use of an adhesive and the on-site connector attachment work can be speeded up more. In this way, the optical connector 14 can effectively reduce the external dimensions in the direction of extension of the ferrule and further has a superior on-site installation efficiency and safety.

Further, the optical fiber 16 with a connector having the above configuration has the effect of reduction of the external dimensions of the optical connector 14 and superior on-site installation efficiency and safety. Therefore, the optical fiber 16 with a connector can be particularly suitably used as an optical fiber cable laid using metal pipe inside the walls of homes in lead-in work for extending and laying an optical fiber cable from a public optical fiber network to the individual homes. In this application, the socket-type optical connector 14 can be held with a sufficient margin of space in a switchbox provided at a predetermined position indoors while suppressing the optical loss inside the optical fiber cable 162. Note that the configuration of the holding section 94 provided at the optical connector 14 is not limited to that of a socket-type optical connector such as in the illustrated embodiment. It can also be provided at a plug-type optical connector such as an optical connector 10. Further, the optical connector 14 can be provided with a plurality of ferrules 92 and a plurality of holding sections 94 corresponding to the individual ferrules 92 so as to form a multi-fiber optical connector.

Note that, in the optical connector 14, when the holding member 140 of the holding section 94 is located at the nonfunctional position, the coated optical fiber 160 of the optical fiber cable 162 fitted in the holding groove 152 of the extension part 146 of the holding member 140 may be in a somewhat bending state in an exposed length extending up to the rear end wall 106 of the socket block 96 of the body 90. When such a bending state is allowed, it is possible to prevent the coated optical fiber 160 from being subjected to an unexpected tensile force during the rotation of the holding member 140 from the nonfunctional position to the functional position. It is also possible to advantageously relieve the demand for accuracy in relation to the position of the rotational axis 140a of the holding member 140 or the exposed length of the coated optical fiber 160 of the optical fiber cable 162. Further, if the coated optical fiber 160 is bending when the holding member 140 is in the nonfunctional position, the entire exposed length of the optical fiber 168 is surely received within the socket block 96, so that it is possible to effectively avoid a disadvantage due to the exposure of the optical fiber 168 outside the body 90.

The above-mentioned plug-type optical connector 10 and the socket-type optical connector 14, as shown in FIG. 9 and FIG. 10, are detachably combined to form the optical fiber connecting device 18. In the optical fiber connecting device 18, when connecting the optical connector 10 attached to the end of the optical fiber cord 82 and the optical connector 14 attached to the end of the optical fiber cable 162, the first part 60 of the sleeve holder 52 of the aligning sleeve member 24 attached to the body 20 of the optical connector 10 is inserted into the first recess 100a of the socket block 96 of the optical connector 14. Here, the first part 60 of the aligning sleeve member 24 and the first recess 100a of the socket block 96 are formed to have shapes and dimensions enabling complementary engagement without any rattling.

The aligning sleeve member 24 is inserted into the socket block 96. Along with this, the ferrule 92 of the optical connector 14 is inserted from the abutting end face 138 in the slotted sleeve 50 of the aligning sleeve member 24. Here, by forming the ferrules 22 and 92 of the two connectors 10 and 14 to the same dimensions and shapes, the ferrule 92 is inserted into the bore 58 of the slotted sleeve 50 until any length part adjoining the abutting end face 138 passes through the open end 60b of the first part 60 of the sleeve holder 52 and strikes the abutting end face 46 of the ferrule 22 of the optical connector 10 (FIG. 10). In this state, the slotted sleeve 50 contacts the cylindrical outer circumference 92b of the ferrule 92 at its inner circumference 50b and is slightly elastically pushed wider and centers and supports the ferrule 92 at a predetermined position by its elastic recovery force. Therefore, in this state, the center axis 92a of the ferrule 92 is securely arranged precisely aligned with the center axis 50a of the slotted sleeve 50, that is, the center axis 22a of the ferrule 22. Further, the abutting end faces 46 and 136 of the two ferrules 22 and 92 come into contact and abut against each other under the bias force of the compression helical spring 128, whereby the pair of optical fibers 88 and 168 secured to the two ferrules 22 and 92 are connected in a state with the end faces abutting centered with a high accuracy.

If the ferrule 92 of the optical connector 14 is inserted into the bore 58 of the slotted sleeve 50 of the aligning sleeve member 24, the arm part 54b of the movable shutter 54 arranged passively displaceably in the bore 58 of the slotted sleeve 50 in advance strikes the ferrule 92 at its end 54d and elastically bends to be passively pulled into the slot 56 of the slotted sleeve 50 (FIG. 10). Therefore, the movable shutter 54 does not interfere with the end face abutment and connection of the optical fibers 88 and 168 due to the abutting of the ferrules 22 and 92. Further, if the optical connectors 10 and 14 are detached, the ferrule 92 of the optical connector 14 is pulled out from the bore 58 of the slotted sleeve 50 of the aligning sleeve member 24. Along with this, the arm part 54b of the movable shutter 54 elastically recovers and its end 54d is arranged on the extension of the center axis 22a of the ferrule 22 in the bore 58 of the slotted sleeve 50.

In the optical fiber connecting device 18 having the above configuration, the actions and effects of the optical connectors 10 and 14 and optical fibers 12 and 16 with connectors explained above act synergistically. In particular, it will be understood that the device can be preferably applied to an optical transmission line laid indoors. Note that in the optical fiber connecting device according to the present invention and the optical connector and optical fiber with a connector according to the present invention, the movable ferrule structure (in the illustrated embodiment, the socket block 96 for supporting the ferrule 92) and biasing means (in the illustrated embodiment, the compression helical spring 128) for bringing the abutting end faces of the pair of ferrules into abutment under pressure may be provided at the plug-type optical connector or may be provided at both optical connectors instead of the illustrated configuration of providing them at the socket-type connector. Further, as the means for securing the coated optical fiber at the ferrule in the socket-type optical connector, it is also possible to employ a configuration in which the pair of plates elastically held in a state of close contact are pried open and the optical fiber gripped between them or a configuration using a general heat curing type, thermoplastic type, UV curing type, or other adhesive instead of a configuration using the fiber securing member 110 and actuating member 112 of the illustrated embodiment. Further, as the means for securing the coated optical fiber at the ferrule at the plug-type optical connector, it is also possible to employ a mechanical securing structure such as a fiber securing member 110 instead of an adhesive.

Figure 17A:
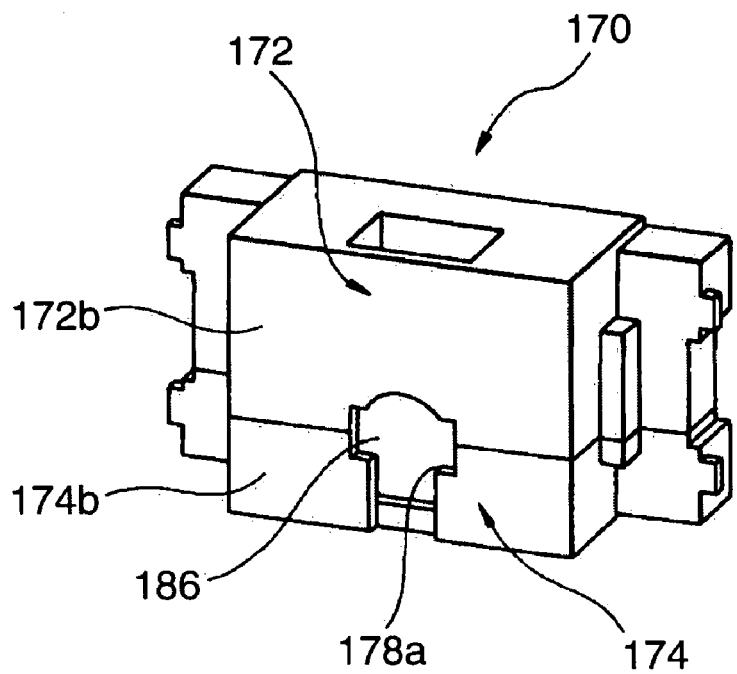
FIG. 17 shows views of an adapter able to be used for the optical fiber connecting device of FIG. 9, wherein (a) is a perspective view and (b) is a vertical sectional perspective view.
Figure 17B:
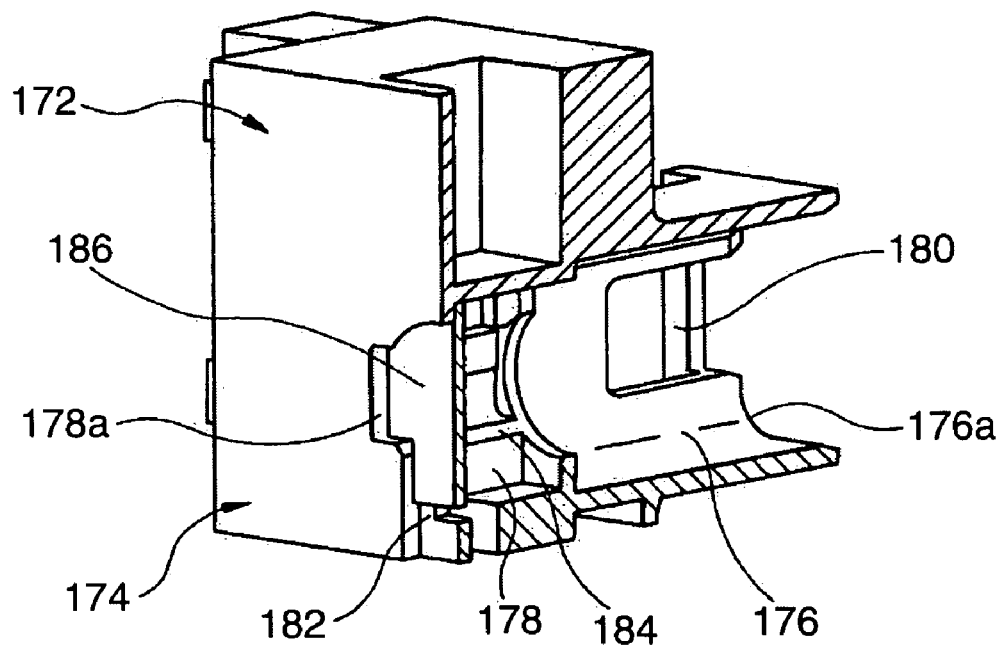

When using the optical fiber connecting device 18 for an optical transmission line laid indoors explained above, it is possible to use a specialized adapter 170 for stably setting the socket-type optical connector 14 at an existing switchbox. As shown in FIG. 17, the adapter 170 is comprised of a combination of a pair of upper and lower adapter members 172 and 174 securely gripping the socket housing 98 of the body 90 of the optical connector 14. These adapter members 172 and 174 cooperate with each other to form a first hollow part 176 for securely holding the first and second parts 122 of the socket housing 98 of the optical connector 14 and a second hollow part 178 for detachably holding the first part 30 of the plug housing 26 of the optical connector 10.

Figure 18:
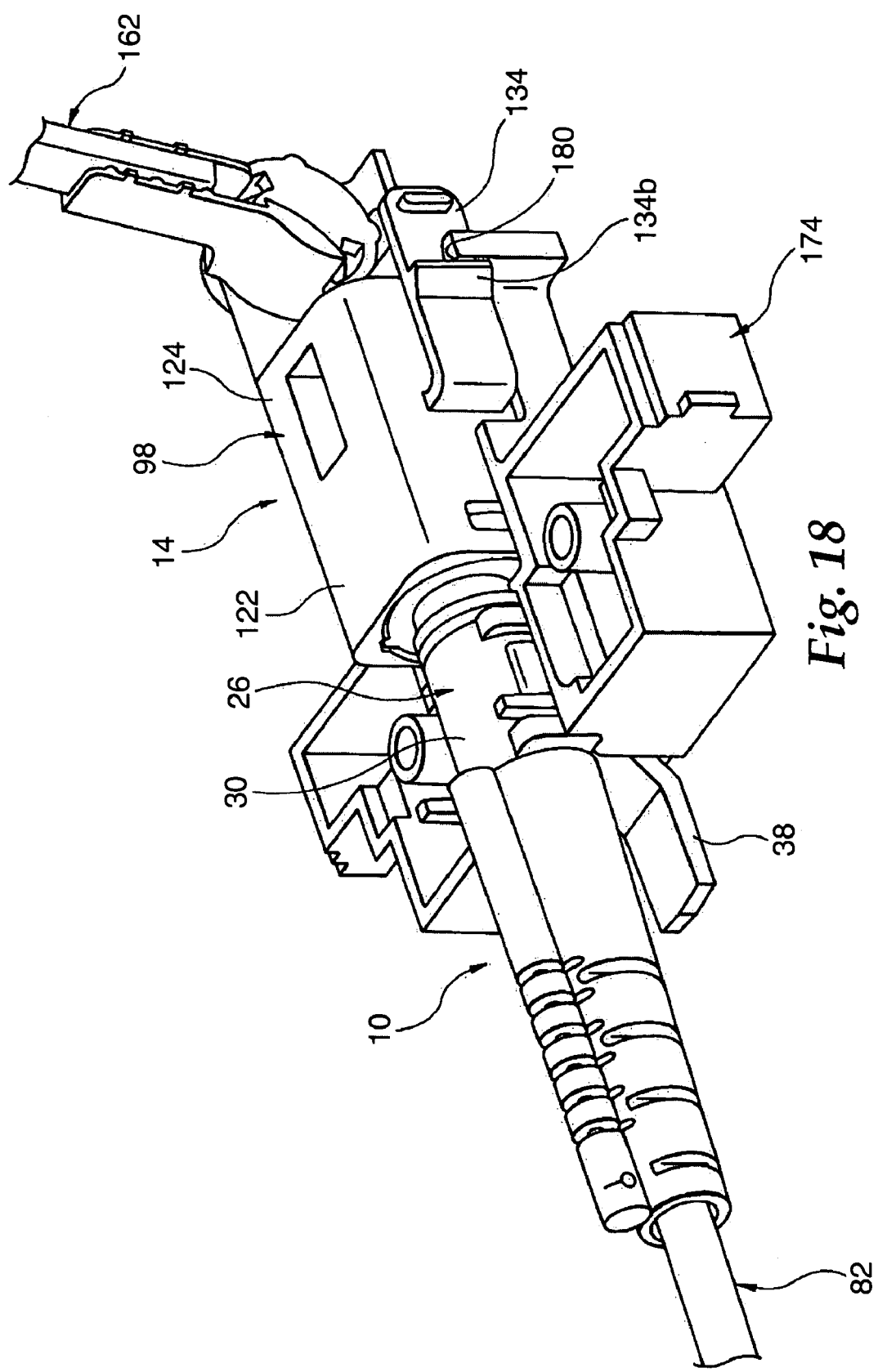
FIG. 18 is a perspective view showing the optical fiber connecting device of FIG. 9 in the state attached to a lower adapter member.
Figure 19:
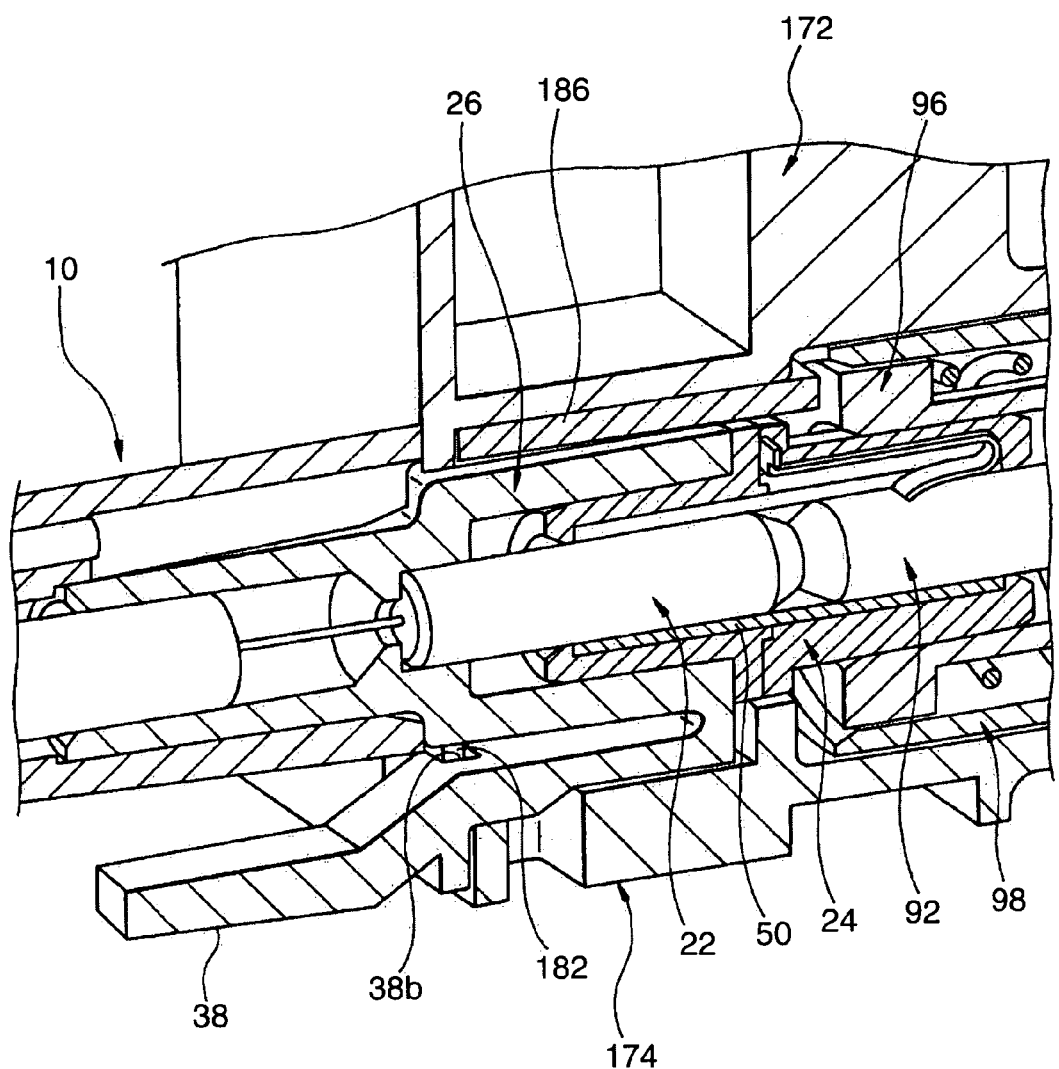
FIG. 19 is a vertical sectional perspective view showing the optical fiber connecting device of FIG. 9 in the state attached to an adapter member of FIG. 17.

The first hollow part 176 of the adapter 170 is formed with a pair of engagement holes 180 for snap engagement of the engagement projections 134*b* of the pair of latch levers 134 provided at the socket housing 98 near the opening 176*a* for insertion of the socket housing 98 of the optical connector 14 (FIG. 18). Further, the second hollow part 178 is formed with a pair of engagement tabs 182 for snap engagement of the pair of engagement recesses 38*b* of the latch levers 38 provided at the plug housing 26 near the opening 178*a* for insertion of the plug housing 26 of the optical connector 10 (FIG. 19). The second hollow part 178 is further formed with a rib 184 slidably guiding the plug housing 26 of the optical connector 10 toward the socket housing 98 of the optical connector 14. The adapter 170 arranges the front end faces 172*b* and 174*b* of the two adapter members 172 and 174 at the opening of the switchbox (not shown) and is securely attached to the switchbox.

The adapter 170 further has a door 186 opening or closing the opening 178*a* of the second hollow part 178. The door 186 is for example connected to an upper housing member 172 inside of the opening 178*a* in a butterfly fashion. The door 186 closes the opening 178*a* of the second hollow part 178 of the adapter 170 by its own weight or the bias force of a spring etc. at the time of nonuse where the optical fiber connecting device 18 does not connect a pair of optical connectors 10 and 14. Due to this, contact by the hand or deposition of dirt at the abutting end face 136 of the ferrule 92 of the optical connector 14 held in the switchbox is prevented and light emitted from the optical fiber 168 through the ferrule 92 leaking from the switchbox is reliably prevented.

At the time of use of the optical fiber connecting device 18, the optical connector 10 is inserted to the second hollow part 178 of the adapter 170 by pressing the open end 60*b* of the aligning sleeve member 24 from the outside to the door 186, whereby the door 186 is pushed up in a pivoting manner at the upper adapter member 172 side and the opening 178*a* is opened. Further, the optical connector 10 is further inserted to the inner side of the second hollow part 178 of the adapter 170, whereby the aligning sleeve member 24 is fit into the socket housing 98 of the optical connector 14 and the optical connectors 10 and 14 are connected with each other. During this insertion operation, the latch lever 38 of the optical connector 10 rides up over the pair of engagement tabs 182 provided at the adapter 170 and elastically bends to hold the engagement tabs 182 in the corresponding engagement recesses 38*b* and thereby elastically recovers so as to securely hold the optical connector 10 at a position suitably connected to the optical connector 14. At this time, the worker can recognize by the striking noise occurring when the latch lever 38 elastically recovers that the optical connectors 10 and 14 are suitably connected.

When separating the optical connectors 10 and 14, the latch lever 38 is forcibly pushed up to release the engagement with the engagement tabs 182, then the optical connector 10 is pulled out from the second hollow part 178 of the adapter 170. Due to this, the door 186 automatically moves in concert to close the opening 178*a*. Note that it is also possible to provide at least one of the engagement tabs 182 and door 186 at the socket housing 98 of the optical connector 14 instead of providing them at the adapter 170. Further, the door 186 can be made a vertical or horizontal sliding opening/closing structure instead of the above springout type opening/closing structure. Further, the adapter 170 can be made an integral structure not split in the vertical direction.

In the optical fibers 12 and 16 with connectors according to the present invention, when end treating the optical fiber cord 82 or optical fiber cable 162, it is not necessary to form perpendicular mirror surface axial end faces 88*a* and 168*a* at the optical fibers 88 and 168 or accurately position these axial end faces 88*a* and 168*a*. It is possible to use a structure able to establish an optical fiber connection suppressing connection loss as much as possible.

Figure 20A:
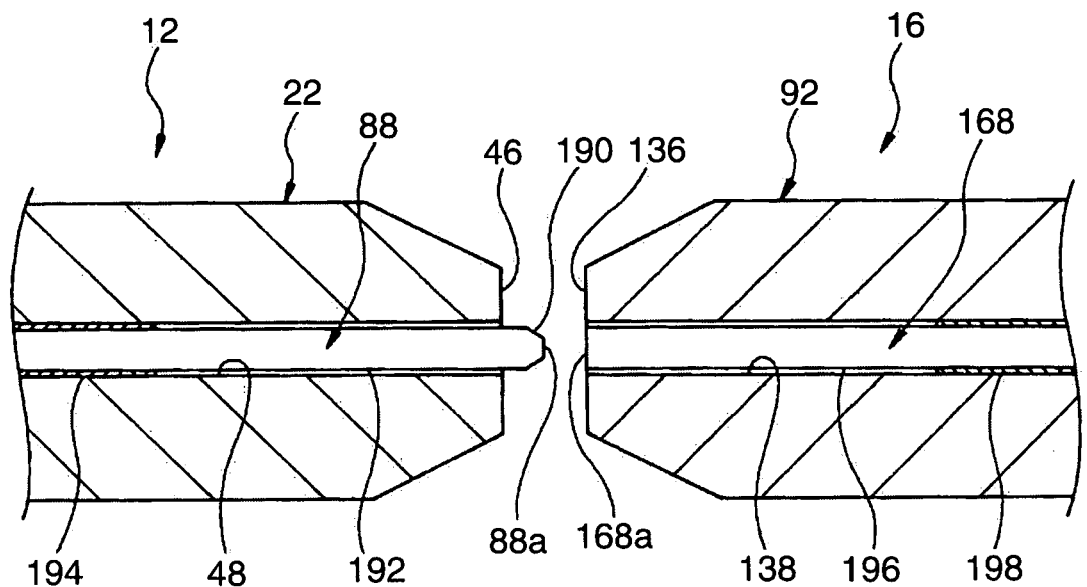
FIG. 20 shows vertical sectional views showing a pair of optical fibers together with a ferrule to which the optical fiber connection method according to the present invention is applied, wherein (a) show the state before connection and (b) the state after connection.
Figure 20B:
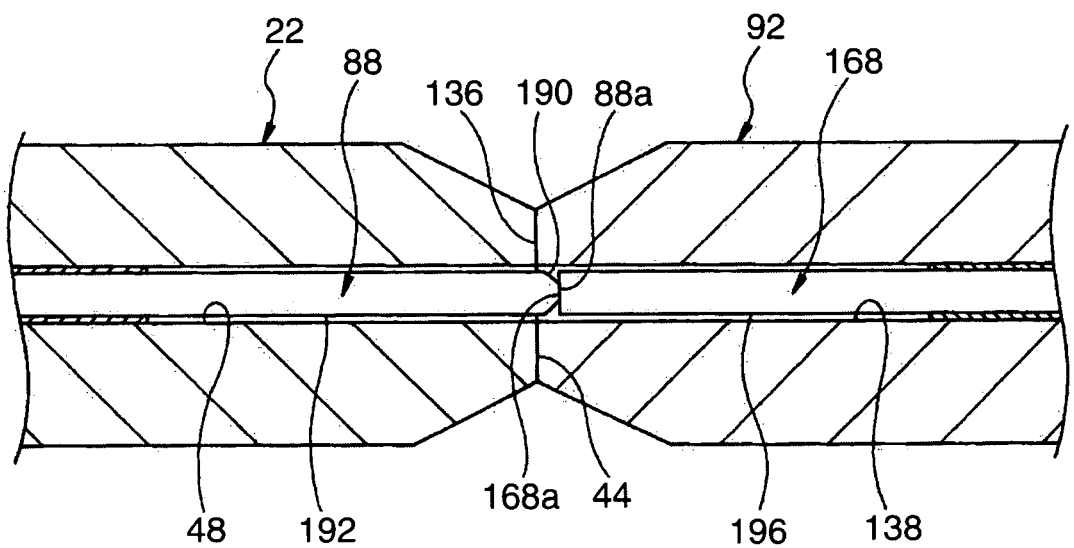

For example, as shown in FIG. 20(*a*), in the optical fiber 12 with a connector, the optical fiber 88 is provided with a beveled area 190 extending tapered toward its axial end face 88*a* adjoining the axial end face 88*a* and is attached to the ferrule 22 with the axial end face 88*a* projecting out slightly from the abutting end face 46 of the ferrule 22. Further, the optical fiber 88 is provided with a free area 192 not secured to the fiber holding channel 48 across a range of a desired length from the abutting end face 46 in the fiber holding channel 48 of the ferrule 22 as the beveled area 190. Note that the part of the optical fiber 88 other than the free area 192 can be secured to the fiber holding channel 48 by an adhesive 194 as illustrated. As opposed to this, in the optical fiber 16 with a connector, the optical fiber 168 has a substantially flat axial end face 168*a* and is attached to the ferrule 92 with the axial end face 168*a* arranged on substantially the same plane as the abutting end face 136 of the ferrule 92. Further, the optical fiber 168 is provided with a free area 196 not secured to the fiber holding channel 138 across a range of a desired length from the abutting end face 136 in the fiber holding channel 138 of the ferrule 92 adjoining the axial end face 168*a*. Note that the part of the optical fiber 168 other than the free area 196 can as explained above be secured by the fiber securing member 110, for example, be secured to the fiber holding channel 138 by an adhesive 194 as illustrated.

If connecting the optical connectors 10 and 14 as explained above to the optical fibers 12 and 16 with connectors configured in this way, the axial end faces 88*a* and 168*a* of the optical fibers 88 and 168 are made to abut against each other by the pressing force of the compression helical spring 128. At this time, as shown in FIG. 20(*b*), the pressing force compresses the free areas 192 and 196 of the optical fibers 88 and 168 in the axial direction in the fiber holding channels 48 and 138 of the ferrules 22 and 92, the axial end faces 88*a* and 168*a* are made to strongly abut against each other, and finally the abutting end faces 46 and 136 of the two ferrules 22 and 92 are made to abut against each other.

According to the above abutment connection mode, there is no longer any need to accurately (for example, 0.1 mm order) position the axial end faces 88*a* and 168*a* of the optical fibers 88 and 168 with respect to the abutting end faces 46 and 136 of the ferrules 22 and 92. That is, if securing the rear area of the optical fiber 88 to for example the fiber holding channel 48 by an adhesive 194 in the state with the axial end face 88a of the optical fiber 88 made to suitably project out from the abutting end face 46 of the ferrule 22 (for example, by several mm), it is possible to strongly reliably make the axial end faces 88a and 168a of the optical fibers 88 and 168 abut against each other as explained above. This extent of positioning accuracy can be achieved by hand at the construction site if using a microscope or other suitable tool. Further, at this time, the pressing force is applied dispersed at the free areas 192 and 196 of the two optical fibers 88 and 168, so concentration of stress to areas near the axial end faces 88a and 168a is avoided and deterioration of the optical characteristics at the optical fibers 88 and 168 after connection is prevented. Note that the axial end face 168a of the other optical fiber 168 can be made easily level with the abutting end face 136 by securing the rear area of the optical fiber 168 to for example the fiber holding channel 138 by an adhesive 198 in the state projecting out suitably (for example, several mm) from the abutting end face 136 of the ferrule 92, then hand polishing the projecting part of the optical fiber 168.

Figure 21A:
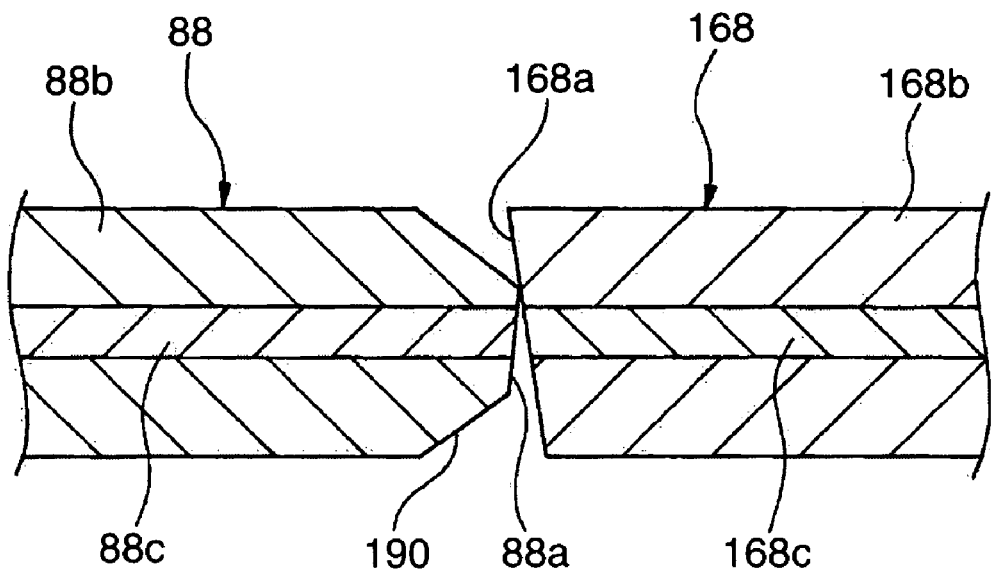
FIG. 21 shows vertical sectional views showing pairs of optical fibers in a state after connection, wherein (a) shows the optical fibers of FIG. 20 and (b) shows the optical fibers of a comparative example.
Figure 21B:
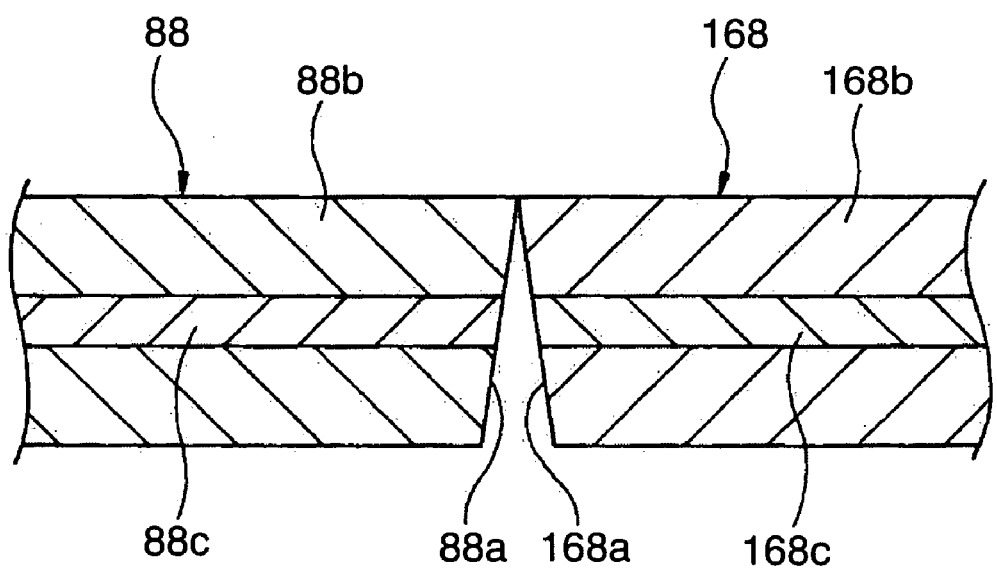

Further, according to the above-mentioned abutment connection mode, it is no longer necessary to form the axial end faces 88a and 168a of the optical fibers 88 and 168 as mirror surfaces extending accurately in the perpendicular direction with respect to the axis. For example, as shown in FIG. 21, even if the axial end faces 88a and 168a of the optical fibers 88 and 168 extend inclined slightly with respect to the axis, the beveled area 190 provided at the optical fiber 88 acts so that the striking position of the claddings 88b and 168b approaches the fibers 88c and 168c (FIG. 21(a)). As a result, it is possible to reduce as much as possible the clearance between the fibers 88c and 168c and thereby possible to reduce as much as possible the connection loss. As opposed to this, when neither of the optical fibers 88 and 168 has the beveled area, there is a possibility of the claddings 88b and 168b striking each other near the outer circumference. In this case, there is a danger of the space between the cores 88c and 168c increasing and the connection loss increasing. Note that the axial end faces 88a and 168a suitably inclined with respect to the axes of the optical fibers 88 and 168 can be formed into mirror surfaces relatively easily by a cutting action using a general optical fiber cutting tool.

Further, according to the above configuration, it is also possible to deliberately form the above-mentioned inclined end faces 88a and 168a of the optical fibers 88 and 168 so that for example the angle of inclination with respect to the perpendicular end faces becomes about 8 degrees. The axial end faces 88a and 168a having such an inclination angle exhibits the effects of reducing the amount of reflection attenuation of light. Note that the inclined end faces 88a and 168a of the optical fibers 88 and 168 can be formed relatively easily by forming the abutting end faces 46 and 136 of the ferrules 22 and 92 at predetermined desired angles of inclination, making the axial end faces 88 and 168a of the optical fibers 88 and 168 suitably project out from the abutting end faces 46 and 136 and arranging them securely at the fiber holding channels 48 and 138, then polishing the projecting parts of the optical fibers 88 and 168 by hand so as to follow the abutting end faces 46 and 136.

By employing the abutting connection mode of the optical fibers according to the present invention, even when connector attachment work is necessary on the construction site for the purpose of use of the optical fibers 12 and 16 with connectors for an optical transmission line laid indoors, there is no need to form perpendicular mirror surface axial direction end faces 88a and 168a at the optical fibers 88 and 186 or position these axial end faces 88a and 168a with a high accuracy and it is possible to interconnect optical fibers 88 and 186 in a state suppressing as much as possible the connection loss.

The abutting connection mode of the optical fibers according to the present invention provides at least at one optical fiber of the pair of optical fibers with connectors a free area not secured to the fiber holding channel of the corresponding ferrule across a range of a predetermined length from the abutting end face in the fiber holding channel and should satisfy one or both of the requirements of (1) forming at least at one of the optical fibers a beveled area extending tapered toward the axial end face adjoining the axial end face and (2) making the axial end face of at least one of the optical fibers project outward from the end abutting face of the corresponding ferrule. Here, regarding the requirement (2), when arranging the other optical fiber at a position where its axial end face is pulled into the fiber holding channel of the ferrule, it is sufficient that the sum of the abutting end faces of the two optical fibers (amount of pull in is minus) become more than zero. Note that if applying these requirements to an optical fiber with a connector generally assembled at the factory as with the illustrated embodiment, it is possible to make the other optical fiber with a connector generally assembled at the construction site a usual simple configuration.

In the above configuration, when the abutment connection of optical fibers under pressure is completed, when the abutting end faces of the two ferrules are not in close contact, a stable abutment and connection state is considered to be obtained by the elasticity of the optical fibers themselves, so it is possible to omit the compression helical spring or other biasing means. Further, as explained above, it is possible not to secure at least one of the optical fibers across the entire length of the fiber holding channel of the corresponding ferrule, but to securely support with respect to the ferrule the optical fiber by a mechanical securing structure set outside of the ferrule.

The abutment and connection mode of optical fibers according to the present invention can be achieved by the following steps, that is, (A) providing a pair of ferrules having abutting end faces and fiber holding channels open at the abutting end faces and securely holding optical fibers, (B) forming at least at one of the pair of optical fibers a beveled area extending tapered toward the axial end face adjoining the axial end face, (C) passing the pair of optical fibers through the fiber holding channels of the pair of ferrules and making the axial end face of at least one of the optical fibers project outward from the abutting end face of the corresponding ferrule and providing at least at one of the pair of optical fibers a free area not secured to said fiber holding channel across a range of a predetermined length from said abutting end face in said fiber holding channel of the corresponding ferrule, and (D) arranging the pair of ferrules at aligning positions where their fiber holding channels are aligned on a straight line and making the axial end faces of the pair of optical fibers abut each other under pressure.

While the preferred embodiments of the present invention are described above with reference to the drawings, the invention does not limited in the illustrated configuration but may be variously modified within the description of the Scope of Claim for Patent.

Figure 22:
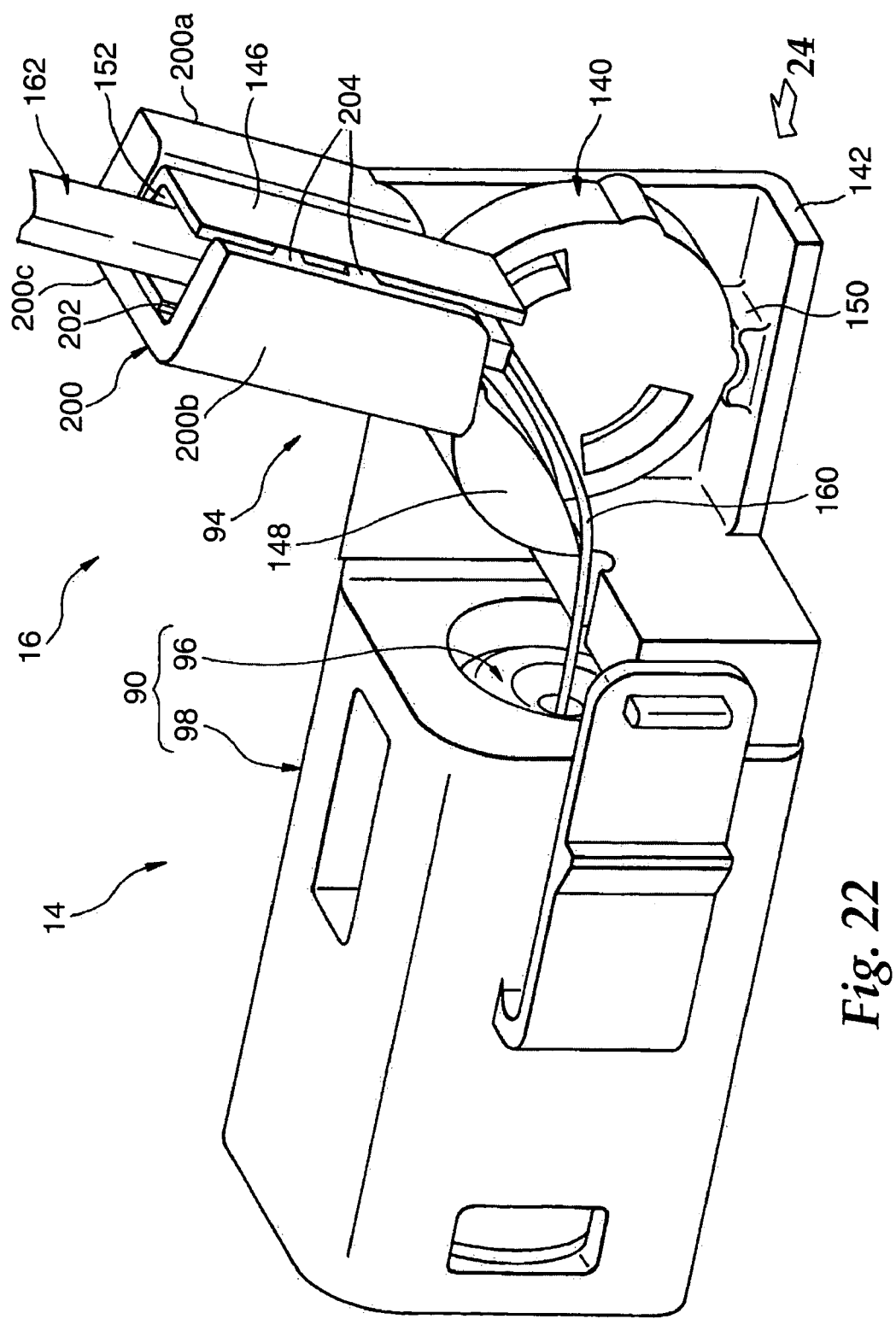
FIG. 22 is a perspective view showing the optical connector of FIG. 5, including a modified holding section, at a functional position.
Figure 23:
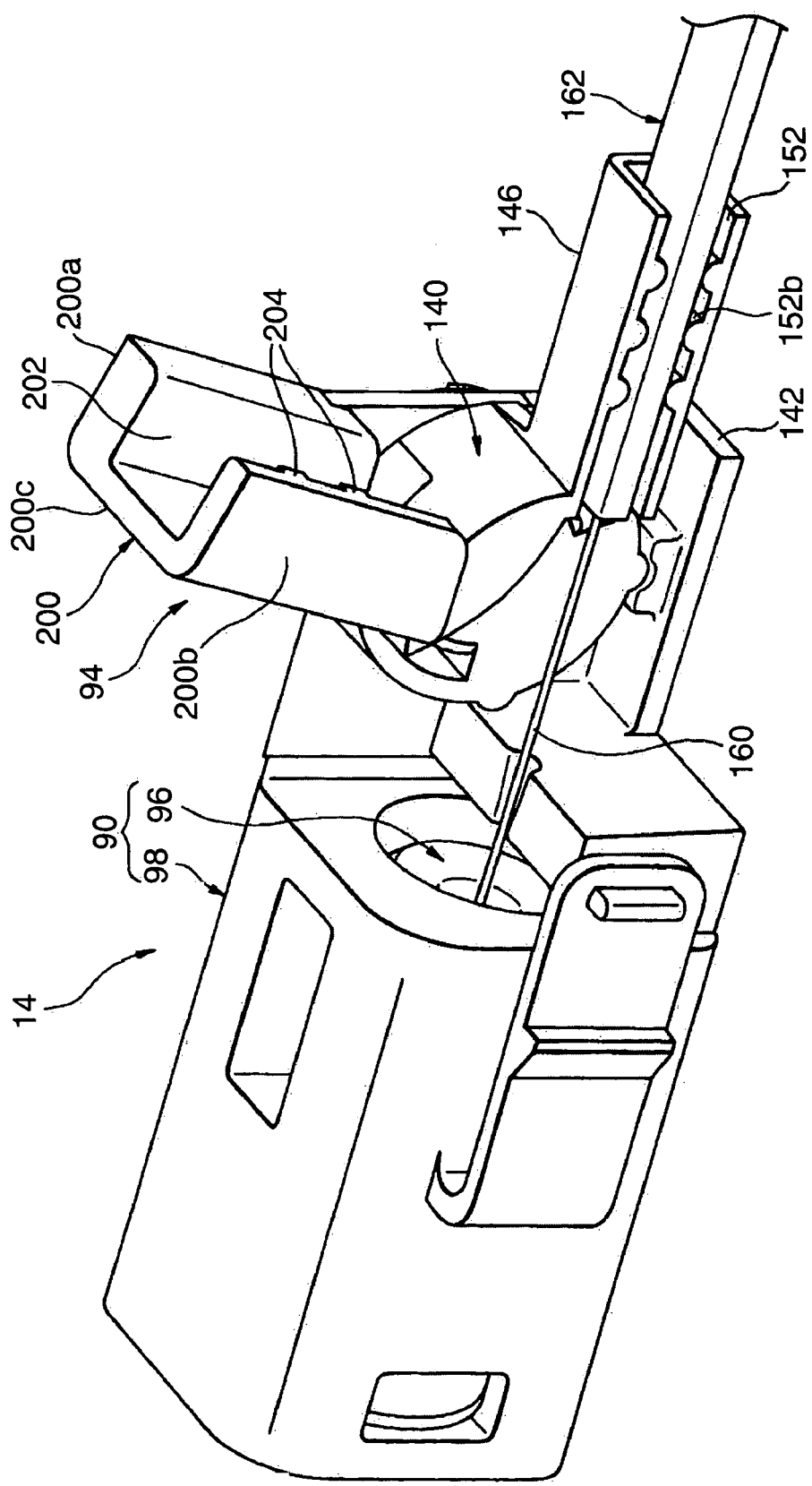
FIG. 23 is a perspective view showing the optical connector of FIG. 22 in a nonfunctional position.

For example, as shown in FIGS. 22 and 23, the socket-type optical connector 14 according to the invention may include, in the holding section 94, an engaging member 200 provided in the body 90 separately from the holding member 140. The engaging member 200 is a U-shaped cross sectional member, and integrally includes a pair of side plates 200a, 200b and a top plate 200c joining the side plates 200a, 200b with each other. The engaging member is formed on the third part 142 of the socket housing 98 of the body 90 at a position opposite to the base seat 150, in such a manner as to extend outward from the third part 142 at a predetermined angle. Note that, although, in the illustrated embodiment, the engaging member 200 is formed integrally at the outer side plate 200a with the third part 142 of the socket housing 98, the engaging member 200 may be made separately from the socket housing 98.

The engaging member 200 includes a receptive groove 202 defined by the side plates 200a, 200b and the top plate 200c. The receptive groove 202 is shaped and dimensioned so as to be entirely receivable the extension part 146 of the holding member 140 holding the optical fiber cable 162 in the holding groove 152. More particularly, the receptive groove 202 of the engaging member 200 opens in its entirety at a side facing to the extension part 146 of the holding member 140 shifting between the nonfunctional position and the functional position, and, when the holding member 140 reaches the functional position, the extension part 146 of the holding member 140 is received in the receptive groove 202 in a condition as to be disposed substantially parallel to the engaging member 200. On the other hand, the holding groove 152 of the holding member 140 opens in its entirety at a side facing to the inner side wall 200b of the engaging member 200.

Figure 24:
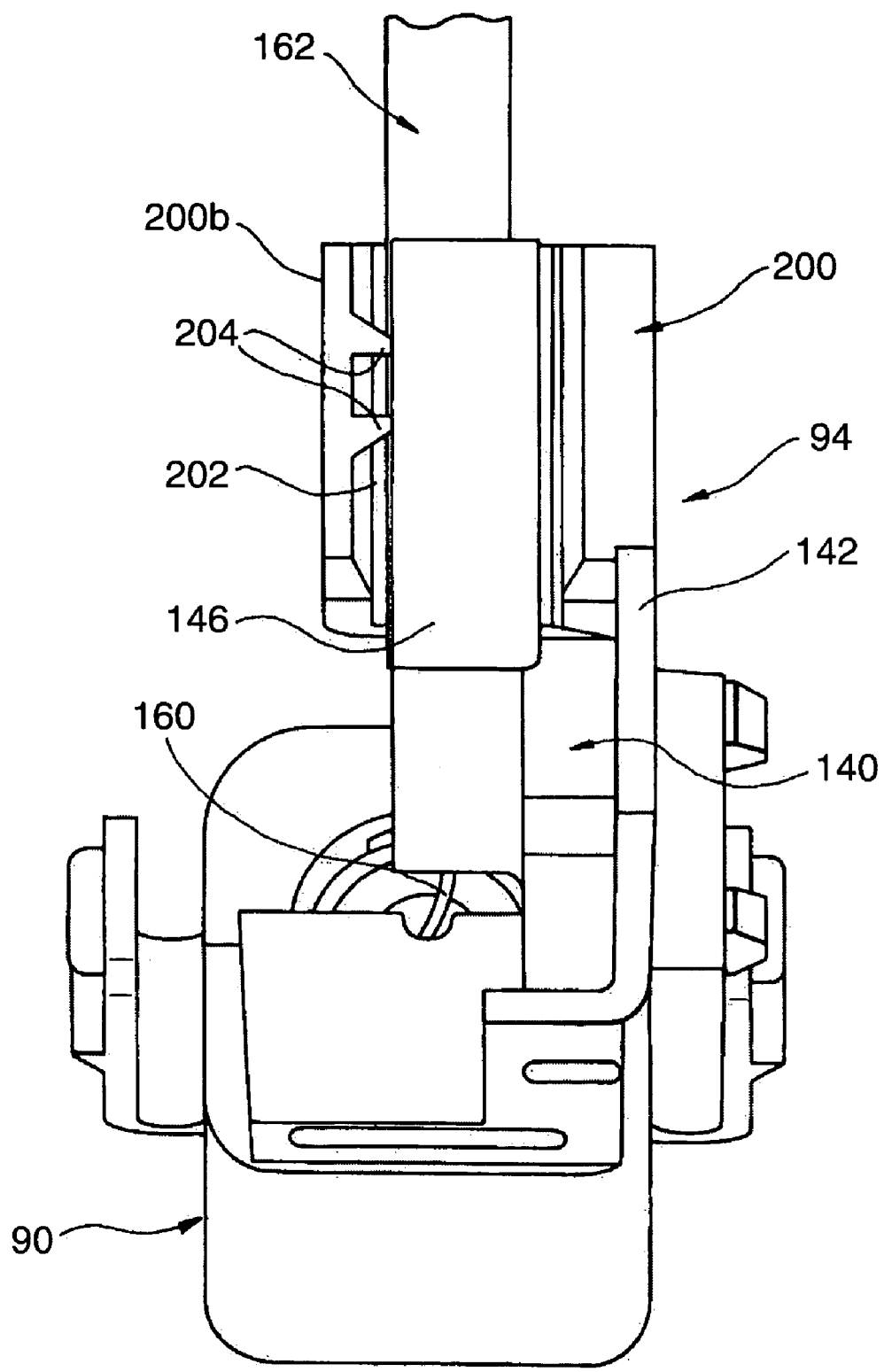
FIG. 24 is an end view showing the optical connector of FIG. 22 from an arrow XXIV.

The engaging member 200 is provided on the inner side wall 200b with at least one engaging projection 204 formed to project into the receptive groove 202. Therefore, when the holding member 140 holding the optical fiber cable 162 in the holding groove 152 is located at the functional position, the engaging projection 204 provided on the side plate 200b of the engaging member 200 bites the sheath 164 of the optical fiber cable 162 (FIG. 14(b)) to statically hold the optical fiber cable 162 in the receptive groove 202 (FIG. 24). Thus, the optical fiber cable 162 is prevented from moving in a lengthwise direction in the holding groove 152 and from being detached through the opening formed along the entire length of the holding groove 152, under the cooperation of the projections 152b biting the sheath 164 in the holding groove 152 and the engaging projection 204 biting the sheath 164 in the receptive groove 202. Also, by providing a plurality of projections 152b as well as a plurality of engaging projections 204, respectively spaced in the longitudinal direction of the optical fiber cable 162, it is possible to mechanically hold the optical fiber cable 162 in the holding groove 152 in a condition where the coated optical fiber 160 is positioned in parallel to a predetermined imaginary axis.

As described above, in the optical connector 14 provided with the holding section 94 including the engaging member 200, even when an external force such as a tensile force is applied to the optical fiber cable 162, to which the optical connector 14 is attached, the engaging member 200 is able to receive or resist the external force, so that it is possible to maintain a proper optical connection with respect to a counterpart optical connector (e.g., the optical connector 12). Particularly, in the socket-type optical connector, often securely arranged in a receptive member such as a switch box, it is possible to surely prevent a joint portion of the optical fiber cable 162 and the optical connector 14 (i.e., the portion of the optical fiber 168 held in the fiber securing member 110) from being damaged due to the external force such as a tensile force.

The configuration of the holding member 140 and the engaging member 200 in the above-described holding section 94 in the optical connector 14 (particularly, the shape of the holding groove 152 and the receptive groove 202) corresponds to the optical fiber cable 162 having a generally rectangular cross-sectional shape as illustrated (FIG. 14(b)). In the optical fiber cable 162 having such a shape, a bending direction avoidable the damage of the cable is substantially restricted in such a direction as to bend in a state where the wider outer surface areas of the sheath 164 are located inside and outside. Therefore, the bending direction of the optical fiber cable 162, to which the optical connector 14 is attached, and which is permitted near the holding section 94, is limited due to the posture or orientation of the optical fiber cable 162 in the holding groove 152 and the receptive groove 202. In other words, there is a case where the shape of the holding groove 152 and the receptive groove 202 in the holding section 94 as illustrated in FIGS. 22 to 24 is not acceptable from the viewpoint of the bending direction of the optical fiber cable 162.

Then, in the optical connector 14, it is preferable to configure the holding member 140 and the engaging member 200 (particularly, the sectional shape and/or the opening direction of the holding groove 152 and the receptive groove 202), while taking into consideration the bending direction of the objective optical fiber cable 162 required in the vicinity of the holding section 94. For example, the configuration as shown in FIGS. 22 to 24 may be modified so that the opening formed along the entire length of the holding groove 152 is provided at a side capable of facing to the top plate 200c of the engaging member 200, so as to hold the optical fiber cable in an orientation rotated at 90 degree from the illustrated orientation. In this arrangement, the engaging projection 204 of the engaging member 200 may be formed on the top plate 200c.

Note that the above-described configuration of the holding section 94 including the holding member 140 and the engaging member 200 is not limitedly applied to the optical connector with ferrule as illustrated, but may be applied to various optical connectors. For example, the above-described configuration of the holding section 94 may be applied as a holding section for statically hold an optical transmission-line member, such as an optical fiber cable, in an optical connector provided in a common connector body with a ferrule securely supporting an optical fiber with a predetermined length and a splicing section provided near the ferrule and able to operate so as to securely support a portion of the optical fiber projecting out from the ferrule and an optical fiber of an optical transmission-line member introduced from the outside. From this viewpoint, the present invention may be defined such that an optical connector comprising a body and a ferrule provided in the body and having a center axis, characterized in that the optical connector comprises a holding member provided in the body to be spaced from the ferrule and including a holding groove for receiving an optical transmission-line member, the holding member being movable between a first position where the holding groove extends in a direction inclined with respect to the center axis of the ferrule and a second position where the holding groove extends in a direction substantially parallel to the center axis of the ferrule, the holding member making a coated optical fiber of the optical transmission-line member bend between the ferrule and the holding groove by a radius of curvature of at least a predetermined minimum radius of curvature; and an engaging member provided in the body separately from the holding member, the engaging member being engaged with the optical transmission-line member received in the holding groove to statically hold the optical transmission-line member in the holding groove when the holding member is placed at the first position.

The present invention is technology for connection of optical fibers and can be extremely suitably used for applications where the external dimensions are limited and where superior on-site installation efficiency and safety are required such as optical connectors able to be freely attached to and detached from optical transmission lines laid indoors.

What is claimed is:

1. An optical connector comprising a body and a ferrule provided in said body, said ferrule having an abutting end face and a fiber holding channel opening in said abutting end face, wherein:
   said optical connector comprises a holding section provided in said body to be spaced from an end face of said ferrule, opposite to said abutting end face, by a predetermined distance;
   said ferrule is displaceable in a direction substantially parallel to said fiber holding channel on said body in such a state as to be attached to a distal end of a coated optical fiber; and
   said holding section is provided with a holding groove extending in a direction inclined with respect to a direction of extension of said fiber holding channel of said ferrule and wherein said holding section holds said coated optical fiber in a bent position between said ferrule and said holding groove by a radius of curvature of at least a predetermined minimum radius of curvature, regardless of a position of said ferrule on said body, wherein the holding groove includes a plurality of projections that extend into an interior portion thereof and are configured to engage a sheath portion of the coated optical fiber.

2. The optical connector of claim 1, wherein said holding section includes a holding member provided in said body to be movable between a functional position where said holding groove extends in said direction inclined with respect to the direction of extension of said fiber holding channel of said ferrule and a nonfunctional position where said holding groove extends in a direction substantially parallel to said direction of extension of said fiber holding channel.

3. The optical connector of claim 2, wherein said holding section further includes an engaging member provided in said body separately from said holding member, said engaging member being engaged with an optical transmission line member received in said holding groove to statically hold the optical transmission line member in said holding groove when said holding member is placed at said functional position.

4. An optical fiber with a connector, comprising the optical connector of claim 1 and an optical fiber cable containing a coated optical fiber, said ferrule being attached to a distal end of said coated optical fiber.

5. An optical fiber connecting device, comprising:
   a plug-type optical connector that includes a first body and a first ferrule provided in said first body and having a first abutting end face, wherein:
      an aligning sleeve member insertable in said first body is provided with a cylindrical bore having openings at opposite axial ends, said aligning sleeve member receiving in a part of said bore a certain length of said first ferrule adjoining said first abutting end face and being supported at a predetermined position with respect to said first ferrule, and
      said aligning sleeve member having a counterpart connector engagement section projecting in a plug shape outside said first body; and
   an optical connector comprising a second body and a second ferrule provided in said second body, said second ferrule having a second abutting end face and a fiber holding channel opening in said second abutting end face, wherein:
      a holding section is provided in said second body to be spaced from an end face of said second ferrule, opposite to said second abutting end face, by a predetermined distance;
      said second ferrule is displaceable in a direction substantially parallel to said fiber holding channel on said second body in such a state as to be attached to a distal end of a coated optical fiber; and
      said holding section is provided with a holding groove extending in a direction inclined with respect to a direction of extension of said fiber holding channel of said second ferrule and to make said coated optical fiber bend between said second ferrule and said holding groove by a radius of curvature of at least a predetermined minimum radius of curvature, regardless of a position of said second ferrule on said body, wherein the holding groove includes a plurality of projections that extend into an interior portion thereof and are configured to engage a sheath portion of the coated optical fiber,
   wherein the plug-type optical connector and the optical connector are detachably combinable with each other.

* * * * *